(12) United States Patent
Karczewicz et al.

(10) Patent No.: US 12,075,037 B2
(45) Date of Patent: *Aug. 27, 2024

(54) PREDICTING FILTER COEFFICIENTS FROM FIXED FILTERS FOR VIDEO CODING

(71) Applicant: QUALCOMM Incorporated, San Diego, CA (US)

(72) Inventors: Marta Karczewicz, San Diego, CA (US); Wei-Jung Chien, San Diego, CA (US); Li Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/810,969

(22) Filed: Jul. 6, 2022

(65) Prior Publication Data
US 2022/0337825 A1    Oct. 20, 2022

Related U.S. Application Data

(63) Continuation of application No. 15/432,848, filed on Feb. 14, 2017, now Pat. No. 11,405,611.
(Continued)

(51) Int. Cl.
*H04N 19/117* (2014.01)
*H04N 19/136* (2014.01)
(Continued)

(52) U.S. Cl.
CPC ......... *H04N 19/117* (2014.11); *H04N 19/136* (2014.11); *H04N 19/14* (2014.11);
(Continued)

(58) Field of Classification Search
CPC ...... H04N 19/117; H04N 19/82; H04N 19/70; H04N 19/136; H04N 19/14; H04N 19/463; H04N 19/80; H04N 19/176
See application file for complete search history.

(56) References Cited

U.S. PATENT DOCUMENTS 8,917,950 B2    12/2014    Liu et al.
9,154,807 B2    10/2015    Joshi et al.
(Continued)

FOREIGN PATENT DOCUMENTS

CN    102714731 A    10/2012
CN    102857749 A    1/2013
(Continued)

OTHER PUBLICATIONS

Aishina E., et al., "Description of Exploration Experiments on Coding Tools," Document JVET-D1011, 4th Meeting, Chengdu, CN, Oct. 15-21, 2016, 13 pages.
(Continued)

*Primary Examiner* — Richard T Torrente
(74) *Attorney, Agent, or Firm* — Shumaker & Sieffert, PA

(57) ABSTRACT

An example device for filtering a decoded block of video data includes one or more processing units configured to construct filters for classes of blocks of a current picture of video data. To construct filters for each of the classes, the processing units are configured to determine a value of a flag that indicates whether a fixed filter is used to predict a set of filter coefficients of the class, and in response to the fixed filter being used to predict the set of filter coefficients, determine an index value into a set of fixed filters and predict the set of filter coefficients of the class using a fixed filter of the set of fixed filters identified by the index value.

20 Claims, 11 Drawing Sheets

Related U.S. Application Data

(60) Provisional application No. 62/324,776, filed on Apr. 19, 2016, provisional application No. 62/295,461, filed on Feb. 15, 2016.

(51) Int. Cl.
    *H04N 19/14*     (2014.01)
    *H04N 19/176*     (2014.01)
    *H04N 19/463*     (2014.01)
    *H04N 19/70*     (2014.01)
    *H04N 19/80*     (2014.01)
    *H04N 19/82*     (2014.01)
    *G06T 5/70*     (2024.01)
    *H04N 19/587*     (2014.01)

(52) U.S. Cl.
    CPC ......... *H04N 19/176* (2014.11); *H04N 19/463* (2014.11); *H04N 19/70* (2014.11); *H04N 19/80* (2014.11); *H04N 19/82* (2014.11); *G06T 5/70* (2024.01); *H04N 19/587* (2014.11)

(56) References Cited

U.S. PATENT DOCUMENTS

| | | |
|---|---|---|
| 9,247,265 B2 | 1/2016 | Chong et al. |
| 9,369,712 B2 | 6/2016 | Ye et al. |
| 10,057,574 B2 | 8/2018 | Li et al. |
| 10,600,156 B2 | 3/2020 | Kim et al. |
| 11,064,195 B2 | 7/2021 | Karczewicz et al. |
| 2010/0074323 A1 | 3/2010 | Fu et al. |
| 2010/0158103 A1 | 6/2010 | Ye et al. |
| 2010/0329361 A1 | 12/2010 | Choi et al. |
| 2011/0069752 A1 | 3/2011 | Watanabe et al. |
| 2011/0216984 A1* | 9/2011 | Tezuka ............... G06T 5/002 382/260 |
| 2011/0274158 A1 | 11/2011 | Fu et al. |
| 2012/0093217 A1 | 4/2012 | Jeon et al. |
| 2012/0230397 A1 | 9/2012 | Ouedraogo et al. |
| 2012/0243611 A1* | 9/2012 | Kondo ............... H04N 19/132 375/E7.193 |
| 2013/0022104 A1 | 1/2013 | Chen et al. |
| 2013/0022113 A1 | 1/2013 | Chen et al. |
| 2013/0022122 A1 | 1/2013 | Oh |
| 2013/0022281 A1 | 1/2013 | Sato |
| 2013/0094569 A1 | 4/2013 | Chong et al. |
| 2013/0101016 A1 | 4/2013 | Chong et al. |
| 2013/0113880 A1 | 5/2013 | Zhao et al. |
| 2013/0142267 A1 | 6/2013 | Esenlik et al. |
| 2013/0182755 A1 | 7/2013 | Chen et al. |
| 2013/0182779 A1 | 7/2013 | Lim et al. |
| 2013/0329789 A1 | 12/2013 | Wang et al. |
| 2014/0072033 A1 | 3/2014 | Chuang et al. |
| 2014/0086501 A1 | 3/2014 | Ikeda et al. |
| 2014/0092978 A1 | 4/2014 | Bugdayci et al. |
| 2014/0133556 A1 | 5/2014 | Chen et al. |
| 2015/0071356 A1 | 3/2015 | Kim et al. |
| 2015/0161772 A1 | 6/2015 | Greiner et al. |
| 2015/0326865 A1 | 11/2015 | Yin et al. |
| 2015/0365703 A1 | 12/2015 | Puri et al. |
| 2017/0223352 A1 | 8/2017 | Kim et al. |
| 2017/0237981 A1 | 8/2017 | Karczewicz et al. |
| 2017/0237982 A1 | 8/2017 | Karczewicz et al. |
| 2017/0238020 A1 | 8/2017 | Karczewicz et al. |
| 2019/0110076 A1 | 4/2019 | Lim et al. |
| 2020/0288146 A1 | 9/2020 | Jeon et al. |

FOREIGN PATENT DOCUMENTS

| | | |
|---|---|---|
| CN | 103141084 A | 6/2013 |
| CN | 103168465 A | 6/2013 |
| CN | 103828366 A | 5/2014 |
| CN | 103843342 A | 6/2014 |
| CN | 104255031 A | 12/2014 |
| CN | 104838660 A | 8/2015 |
| EP | 2048886 A1 | 4/2009 |
| EP | 2584781 A1 | 4/2013 |
| KR | 20120033289 A | 4/2012 |
| WO | WO-2008075247 A1 | 6/2008 |
| WO | WO-2009133844 A1 | 11/2009 |
| WO | WO-2010075342 A2 | 7/2010 |
| WO | WO-2011163629 | 12/2011 |
| WO | WO-2012030433 | 3/2012 |
| WO | WO-2012116088 A1 | 8/2012 |
| WO | WO-2012121352 A1 | 9/2012 |
| WO | WO-2012147010 A1 | 11/2012 |
| WO | WO-2013010248 A1 | 1/2013 |
| WO | WO-2015054813 A1 | 4/2015 |
| WO | WO-2016130801 A1 | 8/2016 |
| WO | WO-2018122092 A1 | 7/2018 |

OTHER PUBLICATIONS

Albrecht M., et al., "Description of SDR, HDR and 360° Video Coding Technology Proposal by Fraunhofer HHI", 10. JVET Meeting; Apr. 10, 2018-Apr. 20, 2018; San Diego; (The Joint Video Exploration Team of ISO/IEC JTC1/SC29/WG11 and ITU-T SG.16 ), 118 pages, URL: http://phenix.int-evry.fr/jvet/, No. JVET-J0014-v1, Apr. 3, 2018 (Apr. 3, 2018), XP030151172, 118 pages, sections 2.1.4.6, 2.1.8.1, 2.1.11.1 and 3.

Alshina E., et al., "Known Tools Performance Investigation for Next Generation Video Coding", 52nd Meeting, Jun. 19 through 26, 2015, Warsaw, Poland; ITU-Telecommunications Standardization Sector, Study Group 16 Question 6, Video Coding Experts Group (VCEG), VCEG-AZ05_r1, Jun. 25, 2015, 7 pages.

Alshina E., et al., "Description of Exploration Experiments on Coding Tools," Joint Video Exploration Team (JVET) of ITU-T SG 16 WP 3 and ISO/IEC JTC 1/SC 29/WG 11, 2nd Meeting: San Diego, USA, Document: JVET-B1011-V2, Feb. 20-26, 2016, pp. 1-5.

An J., et al., "Block Partitioning Structure for Next Generation Video Coding", MPEG doc. m37524 and ITU-T SG16 Doc. COM16-C966-E, 113. MPEG Meeting, Oct. 19-23, 2015, Geneva, (Motion Picture Expert Group or ISO/IEC JTC1/SC29NVG11), No. m37524, Oct. 26, 2015, XP03006589, Oct. 2015, pp. 1-7.

Bossen F., et al., "HM Software Manual," Joint Collaborative Team on Video Coding (JCT-VC) of ITU-T SG16 WP3 and ISO/IEC JTC1/SC29/WG11, Document: JCTVC-Software Manual, Retrieved on Jun. 18, 2015, pp. 1-27.

Bossen F., "Common Test Conditions and Software Reference Configurations", Joint Collaborative Team on Video Coding (JCT-VC) of ITU-T SG16 WP3 and ISO/IEC JTC1/SC29/WG11, 12th Meeting: Geneva, CH Jan. 14-23, 2013, JCTVC-L1100, 4 Pages.

Chein W.G., et al., "VCEG-AZ10-Extension of Advanced Temporal Motion Vector Predictor", 52nd Meeting, Jun. 19 through 26, 2015, Warsaw, Poland; ITU-Telecommunications Standarization Sector Study Group 16 Question 6 Video Coding Experts Group (VCEG), VCEG-AZ10 powerpoint, Jun. 25, 2015, 4 pp.

Chen J., et al., "Algorithm Description of Joint Exploration Test Model 2", Joint Video Exploration Team (JVET) of ITU-T SG 16 WP 3 and ISO/IEC JTC 1/SC 29/WG 11, 2nd Meeting, San Diego, CA, USA, Feb. 20-26, 2016, [JVET-B1001_v3], Mar. 25, 2016 (Mar. 25, 2016), 32 Pages, JVET-B1001 (version 3), pp. 6-7.

Chen J., et al., "Algorithm Description of Joint Exploration Test Model 6 (JEM 6)", 6. JVET Meeting, Hobart, AU, (The Joint Video Exploration Team (JVET) of ISO/IEC JTC1/SC29/WG11 and ITU-T SG.16), JVET-F1001-v2, Mar. 31-Apr. 7, 2017, May 31, 2017 (May 31, 2017), 48 Pages, XP030150793, http://phenix.it-sudparis.eu/jvet/doc_end_user/current_meeting.php?id_meeting=170&search_id_group=1&search_sub_group=1, http://phenix.it-sudparis.eu/jvet/doc_end_user/current_meeting.php?id_meeting=170&search_id_group=1&search_sub_group=1.Sections 2.3.6, 2.3.7.

Chen J., et al., "Coding Tools Investigation for Next Generation Video Coding", ITU-T SG 16, Contribution 806, COM16-C806-E, Draft, Study Period 2013-2016, International Telecommunication Union, Geneva, CH, vol. 6/16, Jan. 27, 2015 (Jan. 27, 2015), XP044083237, pp. 1-7. [Retrieved on Jan. 27, 2015].

(56) References Cited

OTHER PUBLICATIONS

Chen J., et al., "Further Improvements to HMKTA-1.0", 52. VCEG Meeting, Jun. 19, 2015-Jun. 26, 2015, Warsaw, (Video Coding Experts Group of ITU-T SG.16), No. VCEG-AZ07, Jun. 19, 2015 (Jun. 19, 2015), 8 Pages, XP030003885, p. 4, paragraph 2.3.2,section 2.4.2.

Chen X., et al., "EE3: Decoder-Side Motion Vector Refinement Based on Bilateral Template Matching," Joint Video Exploration Team (JVET) of ITU-T SG 16 WP 3 and ISO/IEC JTC 1/SC 29/WG 11, 4th Meeting: Chengdu, CN, Oct. 15-21, 2016, JVET-E0052, pp. 1-4.

Chen, Z., et al., "Research on Sample Adaptive Offset Algorithm Based on Coding Unit Partition for HEVC", East China Normal University, Apr. 2015, 62 Pages.

Choi B., et al., "Parameter Set and Other Related Issues", 13. JCT-VC Meeting; 104. MPEG Meeting; Apr. 18, 2013-Apr. 26, 2013; Incheon; (Joint Collaborative Team on Video Coding of ISO/IEC JTC1/SC29/WG11 and ITU-T SG.16); URL: http://wftp3.itu.int/av-arch/jctvc-site/, No. JCTVC-M0167, Apr. 14, 2013 (Apr. 14, 2013), 4 Pages, XP030114124.

Choi K., et al., "Information on Coding Efficiency Improvements over HEVC for 4K Content", Samsung Electronics, International Organisation for Standardisation Organisation Internationale De Normalisation ISO/IEC JTC1/SC29/WG11 Coding of Moving Pictures and Audio, ISO/IEC JTC1/SC29/WG11 MPEG2015/M37043, Geneva, Switzerland, Oct. 2015, 10 Pages.

Chong I. S., et al., "CE8 Subtest 2: Block Based Adaptive Loop Filter (ALF)," 96. MPEG Meeting, Joint Collaborative Team on Video Coding (JCT-VC) of ITU-T SG16 WP3 and ISO/IEC JTC1/SC29/WG11, No. m19851, 5th Meeting: Mar. 21, 2011-Mar. 25, 2011 Geneva, CH, Mar. 18, 2011, JCTVC-E323, XP030048418, pp. 1-5, p. 2, paragraph 2, Abstract; p. 1 , Block adaptive loop filter; p. 2, lines 1-5, paragraph 2.

De La Rocha Gomes-Arevalillo A., "Investigating the Adaptive Loop Filter in Next Generation Video Coding", Independent thesis Advanced level (degree of Master (Two Years)), Feb. 8, 2017 (Feb. 8, 2017), XP055509944, 75 Pages, Retrieved from the Internet: URL: http://www.diva-portal.org/smash/get/diva2:1072638/FULLTEXT01.pdf [retrieved on Sep. 26, 2018] chapters 3 and 4.

Galpin F., et al., "EE7 Adaptive Clipping in JEM3.0," Joint Video Exploration Team (JVET) of ITU-T SG 16 WP 3 and ISO/IEC JTC 1/SC 29/WG 11, 4th Meeting: Chengdu, CN, Oct. 15-21, 2016, JVET-D0033-r2, pp. 1-10.

Huawei Technology Ltd. Co., "Reference Sample Adaptive Filtering for Intra Coding", ITU, Telecommunication Standardization Sector, COM 16-C 983-E, Oct. 2015, 4 Pages.

International Preliminary Report on Patentability issued in International Application No. PCT/US2017/017964 mailed Apr. 17, 2018, 11 pp. 11 pages.

International Search Report and Written Opinion—PCT/US2017/017964—ISA/EPO—Apr. 11, 2017, 17 pages.

ITU-T H.264, Series H: Audiovisual and Multimedia Systems, Infrastructure of Audiovisual Services—Coding of Moving Video, Advanced Video Coding for Generic Audiovisual Services, The International Telecommunication Union, Jun. 2011, 674 Pages.

"ITU-T H.265, Series H: Audiovisual and Multimedia Systems, Infrastructure of Audiovisual Services—Coding of Moving Video, High Efficiency Video Coding", The International Telecommunication Union, Apr. 2015, 634 Pages, please consider section 7.4.9.6 on p. 102, section 8.5.3.2.6 on p. 141, section 8.5.3.2.7 on pp. 141-145, and section 8.5.3.2.8 on p. 145.

Joshi R.L., et al., "AHG15: On Reference Picture Set Definition and Signaling," 9th JCT-VC Meeting; 100th MPEG Meeting; Joint Collaborative Team on Video Coding of ISO/IEC JTC 1/SC 29/WG 11 and ITU-T SG 16, Geneva; CH, Apr. 27, 2012-May 7, 2012, URL: http://wftp3.itu.int/AV-ARCH/JCTVC-SITE/, No. JCTVC-10344, Apr. 17, 2012 (Apr. 17, 2012), XP030112107, pp. 1-7.

Karczewicz M., "Algorithm Description of Joint Exploration Test Model 1 (JEM1)", 113. MPEG Meeting, Oct. 19, 2015-Oct. 23, 2015, Geneva, (Motion Picture Expert Group or ISO/IEC JTC1/SC29/WG11), No. N15790, Dec. 11, 2015 (Dec. 11, 2015), 27 Pages, 20151030, XP030022473.

Karczewicz M., et al., "EE2.5: Improvements on Adaptive Loop Filter," Joint Video Exploration Team (JVET) of ITU-T SG 16 WP 3 and ISO/IEC JTC 1/SC 29/WG 11, Document: JVET-C0038, 3rd Meeting: Geneva, CH, , May 26-Jun. 1, 2016, 4 pages.

Karczewicz M., et al., "Geometry Transformation-based Adaptive In-Loop Filter," Picture Coding Symposium, IEEE, Dec. 4-7, 2016, pp. 1-5, XP033086856, DOI: 10.1109/PCS.2016.7906346, [retrieved on Apr. 19, 2017], Section III.

Karczewicz M., et al., "Study of Coding Efficiency Improvements beyond HEVC", 113. MPEG Meeting; Oct. 19, 2015-Oct. 23, 2015; Geneva; (International Organization for Standardization Organization International de Normalization Coding of Moving Pictures and Audio Motion Picture Expert Group or ISO/IEC JTC1/SC29/WG11), No. M37102, Oct. 15, 2015 (Oct. 15, 2015), 13 Pages, XP030065470, whole document.

Karczewicz (Qualcomm) M., et al., "Improvements on Adaptive Loop Filter," Joint Video Exploration Team (JVET) of ITU-T SG 16 WP 3 and ISO/IEC JTC 1/SC 29/WG 11, Document: JVET-B0060-v2, 2nd Meeting: San Diego, USA, Feb. 20-26, 2016, XP030150068, URL: http://PHENIX.INT-EVRY.FR/JVET/, No. JVET-B0060-r1, Feb. 17, 2016, 6 pages, http://PHENIX.INT-EVRY.FR/JVET/ , JVET-B0060.docx [retrieved on Feb. 20, 2016].

Lai P., et al., "Loop Filter with Directional Similarity Mapping (DSM)", 4th Meeting, Jan. 20-28, 2011, Daegu, KR; (Joint Collaborative Team on video Coding (JCT-VC) of ITU-T SG16 WP3 and ISO/EIC JTC1/SC29/WG11 ); JCTVCD221_r3, Jan. 25, 2011, pp. 1-9.

Lai W., et al., "CE8 Subtest 1: Block-Based Filter Adaptation with Features on Subset of Pixels," Joint Collaborative Team on Video Coding (JCT-VC) of ITU-T SG16 WP3 and ISO/IEC JTC1/SC29/WG11, 6th Meeting: Torino, Italy, Jul. 14-22, 2011, Document JCTVC-F301, pp. 1-5.

Lan C., et al., "VCEG-AZ08-Enhancement of HEVC using Signal Dependent Transform (SDT)", 52nd Meeting, Jun. 19 through 26, 2015, Warsaw, Poland; ITU-Telecommunications Standarization Sector Study Group 16 Question 6 Video Coding Experts Group (VCEG),VCEG-AZ08_V2, Jun. 25, 2015,7 pp.

"Golomb coding," accessed from https://en.wikipedia.org/wiki/Golomb_coding, accessed on May 9, 2016, 8 pp.

Lin (Huawei Technologies) S., et al., "Affine Transform Prediction for Next Generation Video Coding", 113. MPEG Meeting, Oct. 19, 2015-Oct. 23, 2015, Geneva, (Motion Picture Expert Group or ISO/IEC JTC1/SC29/WG11), No. m37525, International Organisation for Standardisation Organisation Internationale De Normalisation ISO/IEC JTC1/SC29/WG11 Coding of Moving Pictures and Audio, ISO/IEC JTC1/SC29/WG11 MPEG2015/m37525, Geneva, Switzerland, Oct. 26, 2015 (Oct. 26, 2015), XP030065892, 10 Pages.

Liu H., et al., "Local Illumination Compensation", 52, VCEG Meeting, Jun. 19, 2015-Jun. 26, 2015, Warsaw, (Video Coding Experts Group of ITU-T SG.16), No. VCEG-AZ06, Jun. 18, 2015 (Jun. 18, 2015),11 Pages, XP030003883, Section 2 and 2.3.

Maani E., et al., "Parametric Adaptive Loop Filter", 5. JCT-VC Meeting, 96, MPEG Meeting, Mar. 16, 2011-Mar. 23, 2011; Geneva; (Joint Collaborative Team on Video Coding of ISO/ IEC JTC1/SC29/WG11 and ITU-T SG.16); URL: http://wftp3.itu.int/av-arch/jctvc-site/, No. JCTVC-E320, Mar. 10, 2011 (Mar. 10, 2011), 5 Pages, Mar. 23, 2011, XP030008826, whole documents.

Matsumura M., et al., "CE2.c.2: Reduction of Number of Filter Classes in BA Mode with having Flexible Directional Features", 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG.16 ); 6 pages, URL: http://wftp3.itu.int/av-arch/jctvc-site/, No. JCTVC-10054, Apr. 16, 2012 (Apr. 16, 2012), XP030111817.

Qualcomm: "Mode-Dependent Non-Separable Secondary Transform", ITU-T SG16 Meeting, Oct. 12, 2015-Oct. 23, 2015, Geneva, No. T13-SG16-C-1 044, Sep. 30, 2015 (Sep. 30, 2015), XP030100752.

Response to Written Opinion from International Application No. PCT/US2017/017964 filed on Dec. 14, 2017, 4 pp.

(56) References Cited

OTHER PUBLICATIONS

Rosewarne C., et al., "High Efficiency Video Coding (HEVC) Test Model16 (HM 16) Improved Encoder Description Update 4", 22nd Meeting, Oct. 15 through 21, 2015, Joint Collaborative Team on Video Coding (JCT-VC) of ITUSG16 and ISO/IEC JTC1/SC29/WG11, JCTVC-V1002, Oct. 2015, 62 pp.
Said A (Qualcomm Incorporated)., et al., "Position Dependent Intra Prediction Combination", International Organisation for ISO/IEC JTC1/SC29/WG11 Coding of Moving Pictures and Audio, ISO/IEC JTC1/SC29/WG11 MPEG2015/M37502, 113, MPEG Meeting, Oct. 19, 2015-Oct. 23, 2015, Geneva, (Motion Picture Expert Group or ISO/IEC JTC1/SC29/WG11), No. m37502, Geneva, CH, 4 Pages, Oct. 23, 2015 (Oct. 23, 2015), XP030065870, section 2.1, ITU-T SG16/Q6 Doc COM16-C1046.
Second Written Opinion issued in International Application No. PCT/US2017/017964 mailed on Jan. 23, 2018, 7 pp.
Sjoberg R., et al., "JEM Bug Fix for ALF Cross-Picture Prediction", 5th JVET Meeting, The Joint Video Exploration Team of ISO/IEC JTC 1/SC 29/WG11 and ITU-T SG 16 WP 3, Geneva, CH, Jan. 12, 2017-Jan. 20, 2017, URL: http://phenix.int-evry.fr/JVET, No. JVET-E0030, 5 Pages, Jan. 2, 2017 (Jan. 2, 2017), XP030150494.
Strom J., et al., "EE2-JVET related: Division-free bilateral filter," Joint Video Exploration Team (JVET) of ITU-T SG 16 and ISO/IEC JTC 1/SC 29/WG 11, 6th JVET Meeting: Hobart, AU, Mar. 31-Apr. 7, 2017, JVET-F0096, pp. 1-7, Apr. 2, 2017 (Apr. 2, 2017), XP030150774, URL: http://phenix.int-evry.fr/jvet/.
Suehring K., et al., "JEVT common test conditions and software reference configurations", 2nd Meeting, Feb. 20 through 26, 20016, San Diego, USA; Joint Collaborative Video Exploration Team (JVET) of ITU-T-SG 16 WP 3 and ISO/IEC JTC 1/SC 29/WG 11, JVET-B1010, Apr. 4, 2016, 4 pp.
Sullivan G.J., et al., "Meeting Report of the 5th JVET Meeting", 5th JVET Meeting, The Joint Video Exploration Team of ISO/IEC JTC 1/SC 29/WG 11 and ITU-T SG 16, Geneva, CH, Jan. 12, 2017-Jan. 20, 2017, URL: http://phenix.int-evry.fr/JVET/, No. JVET-E1000, Mar. 30, 2017 (Mar. 30, 2017), XP030150646, pp. 1-103.
Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012 (Dec. 1, 2012), pp. 1649-1668, XP011487803, ISSN: 1051-8215, DOI: 10.1109/TCSVT.2012.2221191, http://dx.doi.org/10.1109/TCSVT.2012.2221191, http://dx.doi.org/10.1109/TCSVT.2012.2221191.
Taiwan Search Report—TW106104968—TIPO—Jun. 1, 2021.
Tsai C-Y., et al., "Adaptive Loop Filtering for Video Coding", IEEE Journal of Selected Topics in Signal Processing, vol. 7, No. 6, Dec. 1, 2013, pp. 934-945, XP055265962, Dec. 6, 2013 (Dec. 6, 2013), US, ISSN: 1932-4553, DOI: 10.1109/JSTSP.2013.2271974, the whole document.
U.S. Appl. No. 15/432,839, by Marta Karczewicz, et al., filed Feb. 14, 2017.
U.S. Appl. No. 15/432,857, by Marta Karczewicz, et al., filed Feb. 14, 2017.
U.S. Appl. No. 16/025,772, by Marta Karczewicz, et al., filed Jul. 2, 2018.
Valin J-M., "The Daala Directional Deringing Filter," dated Sep. 7, 2018, pp. 1-7.
Wang Y-K., et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages.
Wiegand T., et al., "WD3: Working Draft 3 of High-Efficiency Video Coding," Document JCTVC-E603, 5th Meeting: Geneva, CH, Mar. 16-23, 2011, 223 pages.
Wiegand T., et al., "WD3: Working Draft 3 of High-Efficiency Video Coding", JCTVC-E603_d8, Joint Collaborative Team on Video Coding (JCT-VC) of ITU-T SG16 WP3 and ISO/IEC JTC1/SC29/WG11, XP030009014, Document JCTVC-E603, 5th Meeting, Geneva, CH, Mar. 16-23, 2011, 239 Pages, Paragraph [8.6.1], Tables 8-13, ISSN:0000-0003.
Yamakage T., et al., "CE8.1: Block Based Adaptive Loop Filter by MediaTek, Qualcomm and Toshiba", 6. JCT-VC Meeting; 97. No. m20743, MPEG Meeting; Jul. 14, 2011-Jul. 22, 2011; Torino; (Joint Collaborative Team on Video Coding of ISO/IEC JTC1/SC29/WG11 and ITU-T SG.16); URL: http://wftp3.itu.int/av-arch/jctvc-site/, No. JCTVC-F321, Jul. 12, 2011 (Jul. 12, 2011), XP030009344, 6 Pages.
Yang H-S., et al., "Research and Implementation of Adaptive AVS Decoder Based on DSP Platform", Chinese Journal of Electron Devices, vol. 31 No. 3, Jun. 2008, 7 Pages.
Yoo Y-J., et al., "Enhanced Adaptive Loop Filter for Motion Compensated Frame," IEEE Transactions on Image Processing, vol. 20, No. 8, Aug. 2011, pp. 2177-2188.
Zhang L., et al., "ALF Temporal Prediction with Temporal Scalability", Joint Video Exploration Team {JVET) of ITU-T SG 16 WP 3 and ISO/IEC JTC 1/SC 29/WG 11, Document No. JVET-E0104, 5th Meeting, Geneva, CH, Jan. 12-20, 2017, 4 Pages, Jan. 7, 2017 (Jan. 7, 2017), XP030150598, last updated Jan. 14, 2017.
Zhang X., et al., "Adaptive Loop Filter with Temporal Prediction", 2012, 5 pages.
Zhao J., et al., "Improvements to ALF", Joint Collaborative Team on Video Coding (JCT-VC) of ITU-T SG16 WP3 and ISO/IEC JTC1/SC29/WG11, 7th Meeting: Geneva, Nov. 2011, JCTVC-G610, pp. 1-9.

* cited by examiner

PREDICTING FILTER COEFFICIENTS FROM FIXED FILTERS FOR VIDEO CODING

This application is a continuation of U.S. application Ser. No. 15/432,848, filed Feb. 14, 2017, which claims the benefit of U.S. Provisional Application No. 62/295,461, filed Feb. 15, 2016, and U.S. Provisional Application No. 62/324,776, filed Apr. 19, 2016, the entire content of each of which is hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the recently finalized ITU-T H.265, High Efficiency Video Coding (HEVC), standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to filtering, such as adaptive loop filtering (ALF). In particular, various techniques for generating filters for different classes of blocks of video data may be performed by a video coder, such as a video encoder or a video decoder. In one example, the video coder may construct multiple sets of filter coefficients and code indexes into the sets of filter coefficients for various classes of blocks, where each index identifies the set of filter coefficients for the corresponding class of blocks. In another example, the video coder may generate a filter for a class of blocks by using a set of filter coefficients of a previously generated filter and applying a geometric transform (such as a rotation, vertical flip, or diagonal flip) to a filter support region or to the filter coefficients themselves. In still another example, the video coder may predict filter coefficients for a class of blocks from either a fixed filter or a filter of a previously coded picture.

In one example, a method of filtering a decoded block of video data includes decoding a current block of a current picture of the video data, selecting a filter (such as according to adaptive loop filtering (ALF)) to be used to filter pixels of the current block, selecting a geometric transform to be performed on one of a filter support region or coefficients of the selected filter, performing the geometric transform on either the filter support region or the coefficients of the selected filter, and filtering the at least one pixel of the current block using the selected filter after performing the geometric transform.

In another example, a device for filtering a decoded block of video data includes a memory configured to store the video data, and one or more processors implemented in circuitry and configured to decode a current block of a current picture of the video data, select a filter (such as according to adaptive loop filtering (ALF)) to be used to filter pixels of the current block, select a geometric transform to be performed on one of a filter support region or coefficients of the selected filter, and filter the at least one pixel of the current block using the selected filter after performing the geometric transform.

In another example, a device for filtering a decoded block of video data includes means for decoding a current block of a current picture of the video data, means for selecting a filter (such as according to adaptive loop filtering (ALF)) to be used to filter pixels of the current block, means for selecting a geometric transform to be performed on one of a filter support region or coefficients of the selected filter, means for performing the geometric transform on either the filter support region or the coefficients of the selected filter, and means for filtering the at least one pixel of the current block using the selected filter after performing the geometric transform.

In another example, a computer-readable storage medium (such as a non-transitory computer-readable storage medium) has stored thereon instructions that, when executed, cause a processor to decode a current block of a current picture of video data, select a filter (such as according to adaptive loop filtering (ALF)) to be used to filter pixels of the current block, select a geometric transform to be performed on one of a filter support region or coefficients of the selected filter, perform the geometric transform on either the filter support region or the coefficients of the selected filter, and filter the at least one pixel of the current block using the selected filter after performing the geometric transform.

In another example, a method of filtering a decoded block of video data includes constructing a plurality of filters for classes of blocks of a current picture of video data, wherein constructing the plurality of filters comprises, for each of the classes, determining whether a fixed filter is used to predict a set of filter coefficients of the class, and in response to determining that a fixed filter is used to predict the set of filter coefficients, determining an index value into a set of fixed filters of the class and predicting the set of filter coefficients of the class using a fixed filter of the set of fixed filters identified by the index value, decoding a current block of a current picture of the video data, determining a class for the current block, selecting a filter of the plurality of filters that corresponds to the class for the current block, and filtering at least one pixel of the current block using the selected filter.

In another example, a device for filtering a decoded block of video data includes a memory configured to store the video data; and one or more processing units implemented in circuitry configured to construct a plurality of filters for classes of blocks of a current picture of video data, wherein to construct the plurality of filters for each of the classes, the one or more processing units are configured to determine whether a fixed filter is used to predict a set of filter coefficients of the class, and in response to determining that a fixed filter is used to predict the set of filter coefficients, determine an index value into a set of fixed filters of the class and predict the set of filter coefficients of the class using a fixed filter of the set of fixed filters identified by the index value, decode a current block of a current picture of the video data, determine a class for the current block, select a filter of the plurality of filters that corresponds to the class for the current block, and filter at least one pixel of the current block using the selected filter.

In another example, a device for filtering a decoded block of video data includes means for constructing a plurality of filters for classes of blocks of a current picture of video data, wherein the means for constructing the plurality of filters comprises means for determining whether a fixed filter is used to predict a set of filter coefficients of each of the class, and means for determining an index value into a set of fixed filters of the class and means for predicting the set of filter coefficients of the class using a fixed filter of the set of fixed filters identified by the index value in response to determining that a fixed filter is used to predict the set of filter coefficients. The device further includes means for decoding a current block of a current picture of the video data, means for determining a class for the current block, means for selecting a filter of the plurality of filters that corresponds to the class for the current block, and means for filtering at least one pixel of the current block using the selected filter.

In another example, a computer-readable storage medium (such as a non-transitory computer-readable storage medium) has stored thereon instructions that, when executed, cause a processor to construct a plurality of filters for classes of blocks of a current picture of video data, wherein the instructions that cause the processor to construct the plurality of filters comprise instructions that cause the processor to, for each of the classes, determine whether a fixed filter is used to predict a set of filter coefficients of the class, and in response to determining that a fixed filter is used to predict the set of filter coefficients, determine an index value into a set of fixed filters of the class and predict the set of filter coefficients of the class using a fixed filter of the set of fixed filters identified by the index value; decode a current block of a current picture of the video data, determine a class for the current block, select a filter of the plurality of filters that corresponds to the class for the current block, and filter at least one pixel of the current block using the selected filter.

In another example, a method of filtering a decoded block of video data includes constructing a plurality of filters for classes of blocks of a current picture of video data, wherein constructing the plurality of filters comprises determining a number of sets of filter coefficients to be generated, generating the number of sets of filter coefficients, and for a subset of the plurality of filters, determining respective indexes that identify one of the sets of filter coefficients for the corresponding filter of the subset; decoding a current block of the current picture, determining a class for the current block, selecting a filter of the plurality of filters that corresponds to the class for the current block, and filtering at least one pixel of the current block using the selected filter.

In another example, a device for filtering a decoded block of video data includes a memory configured to store video data, and one or more processing units implemented in circuitry configured to construct a plurality of filters for classes of blocks of a current picture of the video data, wherein to construct the plurality of filters, the one or more processing units are configured to determine a number of sets of filter coefficients to be generated, generate the number of sets of filter coefficients, and for a subset of the plurality of filters, determine respective indexes that identify one of the sets of filter coefficients for the corresponding filter of the subset; decode a current block of the current picture, determine a class for the current block, select a filter of the plurality of filters that corresponds to the class for the current block, and filter at least one pixel of the current block using the selected filter.

In another example, a device for filtering a decoded block of video data includes means for constructing a plurality of filters for classes of blocks of a current picture of video data, wherein the means for constructing the plurality of filters comprises: means for determining a number of sets of filter coefficients to be generated, means for generating the number of sets of filter coefficients; and means for determining, for a subset of the plurality of filters, respective indexes that identify one of the sets of filter coefficients for the corresponding filter of the subset, and the device further includes means for decoding a current block of the current picture, means for determining a class for the current block, means for selecting a filter of the plurality of filters that corresponds to the class for the current block, and means for filtering at least one pixel of the current block using the selected filter.

In another example, a computer-readable storage medium has stored thereon instructions that, when executed, cause a processor to construct a plurality of filters for classes of blocks of a current picture of video data, wherein the instructions that cause the processor to construct the plurality of filters comprise instructions that cause the processor to: generate a plurality of sets of filter coefficients; and for a subset of the plurality of filters, determine respective indexes that identify one of the sets of filter coefficients for the corresponding filter of the subset; decode a current block of the current picture; determine a class for the current block; select a filter of the plurality of filters that corresponds to the class for the current block; and filter at least one pixel of the current block using the selected filter.

The details of one or more examples are set forth in the accompanying drawings and the description below. Other features, objects, and advantages will be apparent from the description and drawings, and from the claims.

DETAILED DESCRIPTION

Figure 1:
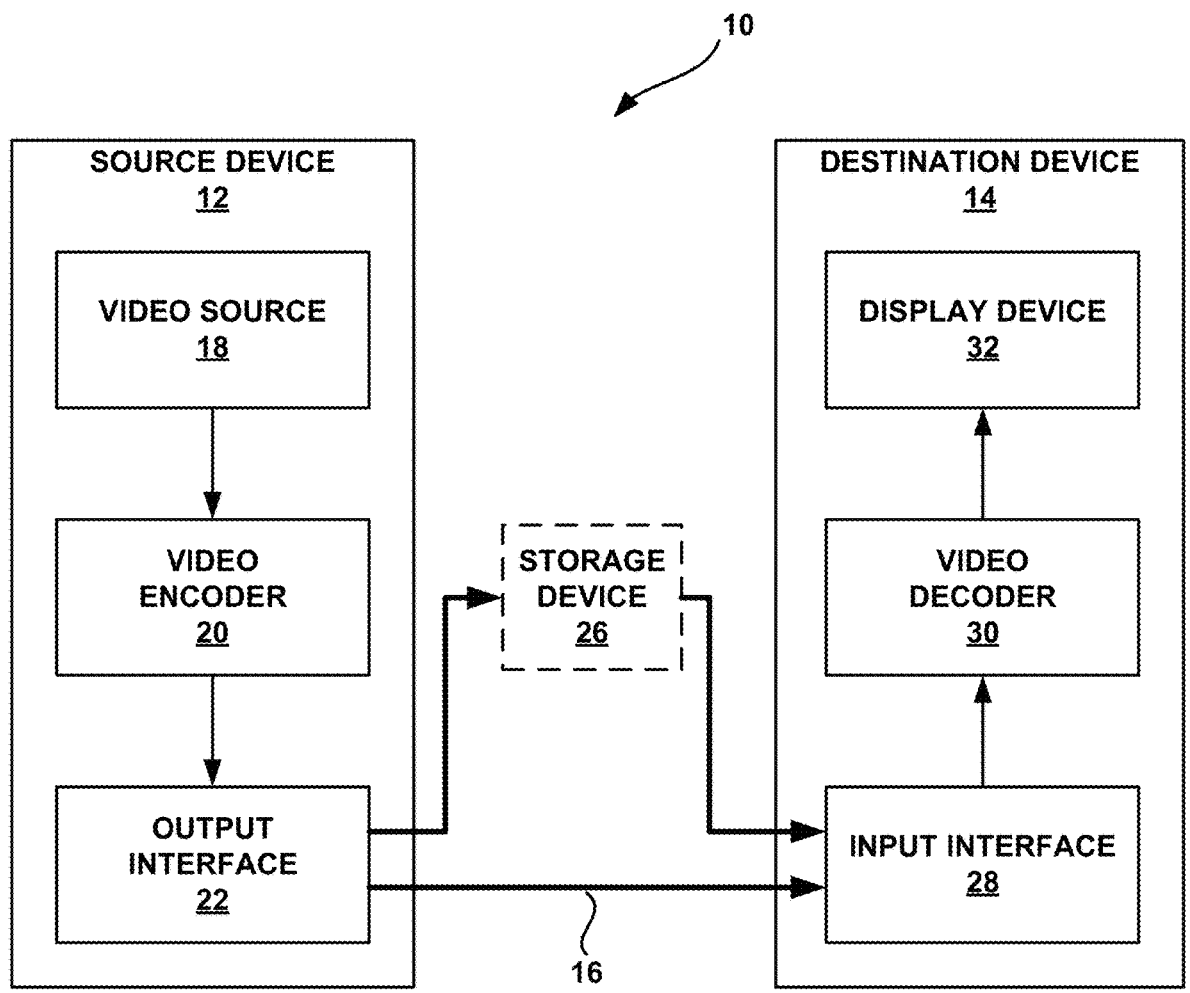
FIG. 1 is a block diagram illustrating an example video encoding and decoding system that may utilize the techniques described in this disclosure.

In a typical video encoder, the frame of an original video sequence is partitioned into rectangular regions or blocks, which are encoded in Intra-mode (I-mode) or Inter-mode (P-mode). The blocks are coded using some kind of transform coding, such as DCT coding. However, pure transform-based coding only reduces the inter-pixel correlation within a particular block, without considering the inter-block correlation of pixels, and it still produces high bit-rates for transmission. Current digital image coding standards also exploit certain methods that reduce the correlation of pixel values between blocks. As will be made clear in the following description, the term video coding may be used in this disclosure to generically refer to either video encoding or video decoding.

In general, blocks encoded in P-mode are predicted from one of the previously coded and transmitted frames. The prediction information of a block is represented by a two-dimensional (2D) motion vector. For the blocks encoded in I-mode, the predicted block is formed using spatial prediction from already encoded neighboring blocks within the same frame. The prediction error, i.e., the difference between the block being encoded and the predicted block, is represented as a set of weighted basis functions of some discrete transform. The transform is typically performed on an 8×8 or 4×4 block basis. The weights—transform coefficients—are subsequently quantized. Quantization introduces loss of information and, therefore, quantized coefficients have lower precision than the originals.

Quantized transform coefficients, together with motion vectors and some control information, form a complete coded sequence representation and are referred to as syntax elements. Prior to transmission from the encoder to the decoder, syntax elements are entropy encoded so as to further reduce the number of bits used to represent the syntax elements.

In the decoder, the block in the current frame is obtained by first constructing its prediction in the same manner as in the encoder and by adding to the prediction the compressed prediction error. The compressed prediction error is found by weighting the transform basis functions using the quantized coefficients. The difference between the reconstructed frame and the original frame is called reconstruction error.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder.

This disclosure describes techniques associated with filtering reconstructed video data in a video encoding and/or video decoding processes and, more particularly, this disclosure describes techniques related to ALF. In accordance with this disclosure, filtering is applied at an encoder, and filter information is encoded in the bitstream to enable a decoder to identify the filtering that was applied at the encoder. The video encoder may test several different filtering scenarios, and based on a rate-distortion analysis, choose a filter or set of filters that produces a desired tradeoff between reconstructed video quality and compression quality. The video decoder receives encoded video data that includes the filter information, decodes the video data, and applies filtering based on the filtering information. In this way, the video decoder applies the same filtering that was applied at the video encoder.

In this disclosure, the term "filter" generally refers to a set of filter coefficients. For example, a 3×3 filter may be defined by a set of 9 filter coefficients, a 5×5 filter may be defined by a set of 25 filter coefficients, a 9×5 filter may be defined by a set of 45 filter coefficients, and so on. The term "set of filters" generally refers to a group of more than one filter. For example, a set of two 3×3 filters, could include a first set of 9 filter coefficients and a second set of 9 filter coefficients. The term "shape," sometimes called the "filter support," generally refers to the number of rows of filter coefficients and number of columns of filter coefficients for a particular filter. For example, 9×9 is an example of a first shape, 7×5 is an example of a second shape, and 5×9 is an example of a third shape. In some instances, filters may take non-rectangular shapes including diamond-shapes, diamond-like shapes, circular shapes, circular-like shapes, hexagonal shapes, octagonal shapes, cross shapes, X-shapes, T-shapes, other geometric shapes, or numerous other shapes or configuration. In this case, for the non-rectangular filter supports, the number of filter coefficients may be different. For example, for a 9×9 diamond filter support, the 9×9 diamond filter may be defined by a set of (9×9/4+1) filter coefficients.

FIG. 1 is a block diagram illustrating an example video encoding and decoding system 10 that may implement the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 26. Similarly, encoded data may be accessed from storage device 26 by input interface. Storage device 26 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 26 may correspond to a file server or another intermediate storage device that may hold the encoded video generated by source device 12. Destination device 14 may access stored video data from storage device 26 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 26 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 26 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 26, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the recently finalized High Efficiency Video Coding (HEVC) standard, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Techniques of this disclosure may utilize HEVC terminology for ease of explanation. It should not be assumed, however, that the techniques of this disclosure are limited to HEVC, and in fact, it is explicitly contemplated that the techniques of this disclosure may be implemented in successor standards to HEVC and its extensions.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As introduced above, the JCT-VC has recently finalized development of the HEVC standard. The HEVC standardization efforts were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of NAL units. A NAL unit is a syntax structure containing an indication of the type of data in the NAL unit and bytes containing that data in the form of a RBSP interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In the field of video coding, it is common to apply filtering in order to enhance the quality of a decoded video signal. The filter can be applied as a post-filter, where the filtered frame is not used for prediction of future frames, or as an in-loop filter, where the filtered frame may be used to predict future frames. A filter can be designed, for example, by minimizing the error between the original signal and the decoded filtered signal. Similarly to transform coefficients, the coefficients of the filter h(k,l), k=−K, . . . , K, l=−K, . . . K may be quantized $$f(k,l) = \text{round}(\text{normFactor} \cdot h(k,l))$$

coded, and sent to the decoder. The normFactor is usually equal to $2^n$. The larger the value of normFactor the more precise is the quantization, which typically results in the quantized filter coefficients f(k,l) providing better performance. On the other hand, larger values of normFactor typically produce coefficients f(k,l) requiring more bits to transmit.

At the decoder, the decoded filter coefficients f(k,l) are applied to the reconstructed image R(i,j) as follows $$\tilde{R}(i,j) = \Sigma_{k=-K}^{K} \Sigma_{l=-K}^{K} f(k,l) R(i+k,j+l) / \Sigma_{k=-K}^{K} \Sigma_{l=-K}^{K} f(k,l) \quad (1)$$

where i and j are the coordinates of the pixels within the frame.

ALF was proposed in HEVC, and was included in various working drafts and test model software, i.e., the HEVC Test Model (or "HM"), although ALF is not included in the final version of HEVC. Among the related technologies, the filter design in HEVC test model version HM-3.0 was generally regarded as the most efficient design.

The ALF in HM-3.0 is based on picture level optimization. That is, the filter coefficients are derived after a whole frame is coded. There were two modes for the luma component, block based adaptation (BA) and region based adaptation (RA). These two modes share the same filter shapes and filtering operations as well as syntax elements. The only difference between them is the classification method.

Adaptive Loop Filtering (ALF) with block based adaption in HM-3.0 is an example of an in-loop filter. In ALF for the luma component, 4×4 blocks in the whole picture are classified based on a directionality (up to 3 directions) of the block and a 2D Laplacian activity (up to 5 activity values) of the block under the assumption that there should be different filters for regions in the image having different characteristics. The calculation of directionality D and unquantized activity A is shown in equations (2) through (5):

$$g_v = \sum_{i=0}^{3} \sum_{j=0}^{3} V_{i,j}, \; V_{i,j} = |2R(i,j) - R(i,j-1) - R(i,j+1)|, \quad 2)$$

$$g_h = \sum_{i=0}^{3} \sum_{j=0}^{3} H_{i,j}, \; H_{i,j} = |2R(i,j) - R(i-1,j) - R(i+1,j)|, \quad 3)$$

$$D = \begin{cases} 1 & g_h > 2*g_v \\ 2 & g_v > 2*g_h, \\ 0 & \text{otherwise} \end{cases} \quad 4)$$

$$A = \sum_{i=0}^{3} \sum_{j=0}^{3} \left( \sum_{k=i-1}^{i+1} \sum_{l=j-1}^{j+1} (V_{k,l} + H_{k,l}) \right), \quad 5)$$

where R(i,j) indicates a reconstructed pixel with relative coordinate (i,j) to the top-left of a 4×4 block. A is further quantized to the range of 0 to 4 inclusively as described in HM-3.0, and the quantized value of A will be denoted as Â.

In total, each block can be categorized into one of 15 (5×3) classes and an index is assigned to each 4×4 block according to the value of D and Â of the block: 5D+Â. Therefore, up to 15 sets of ALF parameters could be signalled for the luma component of a picture. To save the signaling cost, the classes may be merged along class index value. For each class (or merged class), a set of filter coefficients may be signaled. Additionally, in HM-3.0, a flag is signalled at a CU level to indicate whether ALF is applied to the CU.

In accordance with the techniques of this disclosure, a video coding device (such as video encoder 20 or video decoder 30) may perform filtering of decoded video data. Note that the unit for signaling filter coefficients may be a picture/frame, a slice, a tile or others. For simplicity, the descriptions below mainly treat the unit as a picture. However, the techniques of this disclosure are not restricted to picture-level ALF signaling. As discussed in greater detail below, after video encoder 20 encodes a picture of video data, video encoder 20 may subsequently decode the picture, e.g., for use as a reference picture. In this manner, video encoder 20 encodes and decodes video data. Video encoder 20 and video decoder 30 may perform filtering as an "in-loop" filtering process, applying ALF to decoded pictures that are subsequently used as reference pictures for subsequently encoded and/or decoded pictures. Descriptions in this disclosure of a "video coder" should be understood as descriptions of a video encoder, such as video encoder 20, and a video decoder, such as video decoder 30.

In accordance with the techniques of this disclosure, a video coder (such as video encoder 20 and/or video decoder 30) may construct filters for various classes of blocks. The video coder may classify a block based on, for example, directionality of a gradient calculated from pixels of the block. The video coder may calculate one or more of a horizontal direction gradient, a vertical direction gradient, a 45 degree diagonal direction gradient, or a 135 degree diagonal direction gradient. In general, the video coder may construct a different filter for each class of block. However, in some cases, the video coder may calculate a set of filter coefficients used by two or more classes of blocks. For example, the video coder may calculate a plurality of sets of filter coefficients. The video coder may further code an index for each of the classes of blocks (or a subset of the classes of blocks) identifying one set of filter coefficients in the plurality of sets of filter coefficients. Thus, in the case where the video coder codes the same index for two or more classes of blocks, those classes of blocks will use the same set of filter coefficients, i.e., the set of filter coefficients corresponding to the coded index value.

Additionally or alternatively, the video coder may indicate that, for at least one class of blocks, the filter is to be generated by using the same filter, but with a geometric transform applied to either a filter support region of the filter or the filter coefficients. Therefore, even for blocks with the same class index, the filter support may be different due to geometric transforms. Functionally, applying the geometric transform to the filter support region yields the same mathematical results as applying the geometric transform to the filter coefficients, and therefore, the video coder may apply the geometric transform to either the filter support region or the filter coefficients. In this example, the video coder may code, for a current class of block, data identifying a geometric transform type (e.g., a rotation, a diagonal flip, or a vertical flip, or non-geometric transform), as well as a previously constructed filter of which the filter coefficients are to be used for a generated filter for the current class of block.

Additionally or alternatively, the video coder may code a value (e.g., of a flag) indicating whether at least one fixed filter is used to predict filter coefficients for a class of block. That is, the flag may indicate, for example, that filter coefficients for a filter of a class of block are predicted from a fixed filter, or are instead predicted (or inherited) from filters of a previously coded picture or without prediction from either fixed filter or filters from previously coded pictures. In some examples, the video coder may be configured with a plurality of fixed filters for each class of block. In such examples, the video coder may additionally code an index into the plurality of fixed filters, identifying one of the plurality of fixed filters to be used to predict the filter coefficients of a current filter for the class of block, when the value indicates that the filter coefficients are predicted from a fixed filter.

In some examples, the video coder may further code information indicating that either none of the filter coefficients for any of the classes are predicted from any fixed filter, or that all filter coefficients are predicted from fixed filters, or that there are some filter coefficients predicted from fixed filters, while other filter coefficients are not predicted from fixed filters. When none of the filter coefficients are predicted from a fixed filter, the video coder may avoid (e.g., omit or prevent) coding of data representing an index into a plurality of fixed filters. On the other hand, when some or all of the filter coefficients are predicted from a fixed filter, the video code may further code a flag for each class whether the filter for one class is predicted from fixed filter or not. In addition, the video coder may code indexes into respective pluralities of fixed filters for those sets of filter coefficients that are predicted from a fixed filter, where the indexes identify the reference fixed filter from which the corresponding filter coefficients are to be predicted. Furthermore, the video coder may use the fixed filters identified by the indexes to predict the corresponding filter coefficients. After prediction, the video coder may further code residual values (e.g., offset values), representing differences between the predicted filter coefficients and actual filter coefficient values.

The video coder may apply these techniques alone or in combination. For example, a video coder may explicitly code a plurality of sets of filter coefficients, code indexes for a first set of classes of blocks into the plurality of sets of filter coefficients, and predictively code filter coefficients for filters of a second set of classes of blocks from either fixed filters or filters of one or more reference pictures. Alternatively, a video coder may code each of a plurality of sets of filter coefficients either predicted from fixed filters or from a filter of one or more previously coded pictures, and then for each of the classes of blocks, code an index identifying one of the sets of filter coefficients. As yet another example, a video coder may code filter coefficients for a first set of classes of blocks using any of the techniques above, and code geometric transformation information for a second set of classes of blocks, including data identifying a geometric transformation and data identifying one of the first set of classes of blocks from which to inherit filter coefficients.

Figure 2:
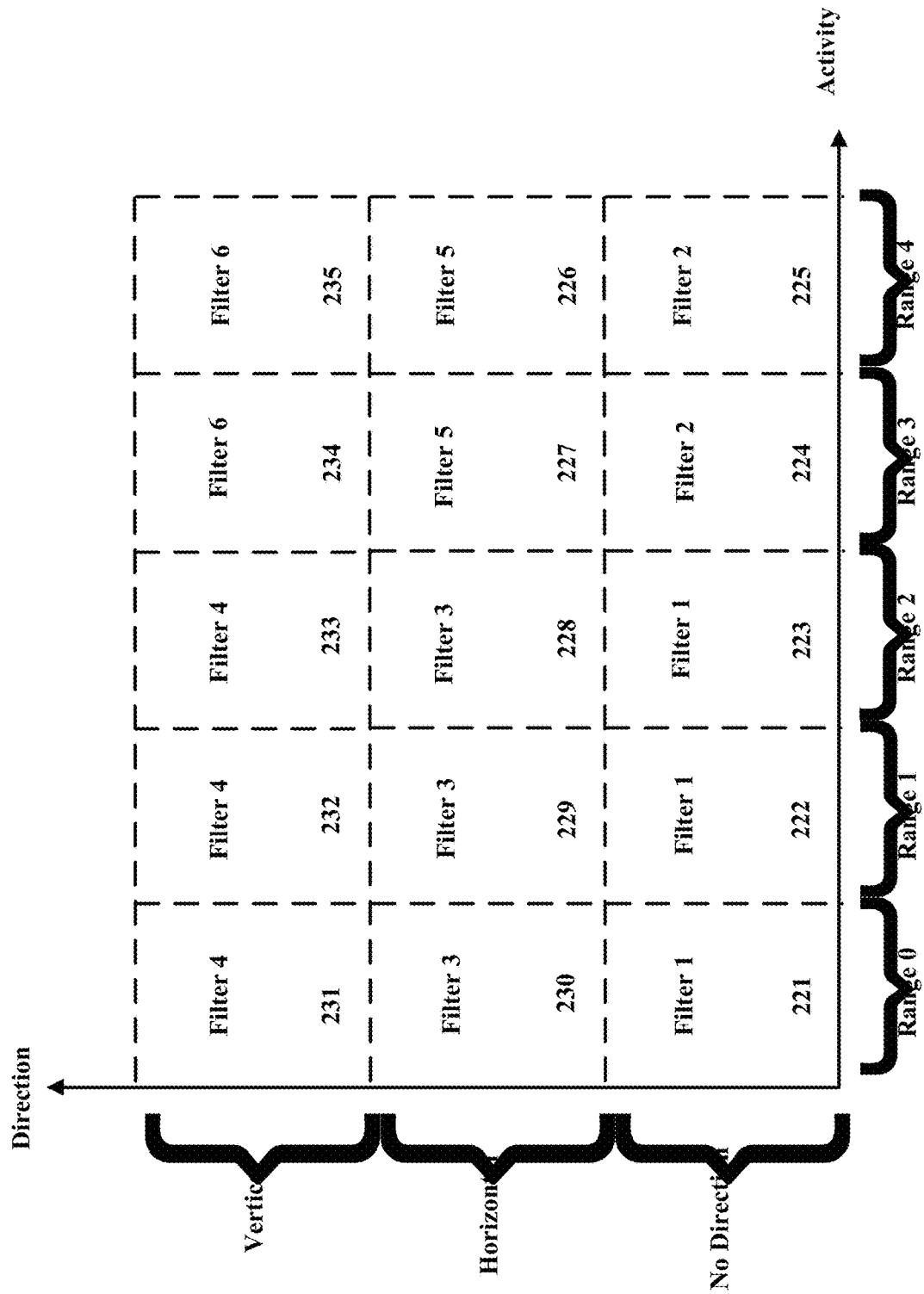
FIG. 2 is a conceptual diagram illustrating a mapping of ranges for an activity metric and a direction metric to filters.

FIG. 2 is a conceptual diagram illustrating the 15 groups (also called classes) used for BA (block based adaptation) classification. In the example of FIG. 2, filters are mapped to ranges of values for an activity metric (i.e., Range 0 to Range 4) and a direction metric. The direction metric in FIG. 2 is shown as having values of No Direction, Horizontal, and Vertical, which may correspond to the values of 0, 1, and 2 above from equation 3. The particular example of FIG. 2 shows six different filters (i.e., Filter 1, Filter 2 . . . Filter 6) as being mapped to the 15 groups, but more or fewer filters may similarly be used. Although FIG. 2 shows an example, with 15 groups, identified as groups 221 through 235, more or fewer groups may also be used. For example, instead of five ranges for the activity metric, more or fewer ranges may be used resulting in more or fewer groups. Additionally or alternatively, instead of only three directions, additional directions (e.g., a 45-degree direction and a 135-degree direction) may also be used. If, for example, 5 ranges of the activity metric were used in conjunction with five directions (e.g., no direction, horizontal, vertical, 45-diagonal, and 135-diagonal), then 25 groups would be used for classification, with each of the 25 groups being mapped to a filter.

For both chroma components in a picture, a single set of filter coefficients may be applied. The filter coefficients of reference pictures may be stored and allowed to be reused as filter coefficients of a current picture. The current picture may choose to use filter coefficients stored for the reference pictures, and bypass the filter coefficients signalling. In this case, only an index to one of the reference pictures needs to be signalled, and the stored filter coefficients of the indicated reference picture are inherited for the current picture.

According to techniques of this disclosure, before filtering, a video coder (e.g., video encoder 20 or video decoder 30) may apply certain geometric transformations, such as rotation, diagonal, and vertical flip, to the pixels in the filter support region (pixels which are multiplied by filtered coefficients in Eq. (1)) depending on the orientation of the gradient of the reconstructed pixel(s) before performing ALF. These transformations may increase similarity between different regions within the picture, e.g., their directionality. This can reduce the number of filters which have to be sent to the decoder, hence reducing number of bits required to represent them, or alternatively reducing the reconstruction error. Applying the transformations to filter support regions is equivalent to applying the transformations directly to the filter coefficients. Thus, the video coder may instead apply the transformations to the filter coefficients instead of to the filter support regions.

According to another technique of this disclosure, which may be used either jointly with or independently from other techniques already introduced, to reduce the number of bits required to represent the filter coefficients, a video coder may merge different classes of blocks. However, unlike in HM-3.0, any set of classes can be merged, even classes having non-consecutive values of C. The information on which classes are merged is provided by sending, for each of the classes (e.g., each of the 25 classes) an index $i_C$. Classes having the same index $i_C$ share the same filter f(k,l). Thus, a video coder may generate a plurality of sets of filter coefficients, and for each of a plurality of classes, code data representing an index value $i_C$, where C may be a value between 1 and the number of classes, and $i_C$ is an index into the generated sets of filter coefficients that identifies the set of filter coefficients for class C.

According to another technique of this disclosure, which may be used either jointly with or independently from other techniques already introduced, another modification relative to ALF as described in HM-3.0 is that a video coder (e.g., video encoder 20 or video decoder 30) may use a set of n fixed filters, obtained, for example, by offline training, assigned to each class to predictively code filter coefficients. For each class for which filter coefficients are predicted from a fixed filter, the video coder may code data representing which one of the n fixed filters is used. In another example, some classes can have the same the set of n fixed filters assigned or even the same set of n fixed filters can be assigned to all classes. Even when the fixed filter is selected for a given class, the coefficients of the adaptive filter can still be signalled for this class. The coefficients of the filter which may be applied to the reconstructed image are, in this case, the sum of the signalled coefficients f(k,l) and the fixed filter coefficients. Number of classes can share the same signaled coefficients f(k,l) even if different fixed filters were chosen for them.

Example implementations of the techniques introduced above will now be described. In one example, each N×N block is categorized into one out of 25 classes based on its directionality D and quantized value of activity Â:

$$C=5D+\hat{A}. \quad (6)$$

Values of the horizontal gradient, vertical gradient, and two diagonal gradients are calculated using 1-D Laplacian:

$$g_v = \sum_{k=i-M}^{i+N+M-1} \sum_{l=j-M}^{j+N+M-1} V_{k,l}, \text{ where} \quad (7)$$

$$V_{k,l} = |2R(k, l) - R(k, l-1) - R(k, l+1)|,$$

$$g_h = \sum_{k=i-M}^{i+N+M-1} \sum_{l=j-M}^{j+N+M-1} H_{k,l}, \text{ where} \quad (8)$$

$$H_{k,l} = |2R(k, l) - R(k-1, l) - R(k+1, l)|,$$

$$g_{d1} = \sum_{k=i-M}^{i+N+M-1} \sum_{l=j-M}^{j+N+M-1} D1_{k,l}, \text{ where} \quad (9)$$

$$D1_{k,l} = |2R(k, l) - R(k-1, l-1) - R(k+1, l+1)|,$$

$$g_{d2} = \sum_{k=i-M}^{i+N+M-1} \sum_{j=j-M}^{j+N+M-1} D2_{k,l}, \text{ where} \quad (10)$$

$$D2_{k,l} = |2R(k, l) - R(k-1, l+1) - R(k+1, l-1)|.$$

In these examples, $g_v$ represents a vertical gradient, $g_h$ represents a horizontal gradient, $g_{d1}$ represents a 45-degree diagonal gradient, and $g_{d2}$ represents a 135-degree diagonal gradient.

Indices i and j refer to the coordinates of the upper left pixel in the N×N block. To assign the directionality D ratio of maximum and minimum of the horizontal and vertical gradients $$g_{h,v}^{max}=\max(g_h,g_v), \ g_{h,v}^{min}=\min(g_h,g_v), \quad (11)$$

and the ratio of maximum and minimum of two diagonal gradients $$g_{d0,d1}^{max}=\max(g_{d0},g_{d1}), \ g_{d0,d1}^{min}=\min(g_{d0},g_{d1}), \quad (12)$$

are compared against each other and with set of thresholds $t_1$ and $t_2$:

Step 1. If both $g_{h,v}^{max} \leq t_1 \cdot g_{h,v}^{min}$ and $g_{d0,d1}^{max} \leq t_1 \cdot g_{d0,d1}^{min}$, D is set to 0 (block is categorized as "texture").

Step 2. If $g_{h,v}^{max}/g_{h,v}^{min} > g_{d0,d1}^{max}/g_{d0,d1}^{min}$ continue from Step 3, otherwise continue from Step 4.

Step 3. If $g_{h,v}^{max} > t_2 \cdot g_{h,v}^{min}$, D is set to 2, otherwise D is set to 1 (block is categorized as "strong horizontal/vertical" or "horizontal/vertical," respectively).

Step 4. If $g_{d0,d1}^{max} > t_2 \cdot g_{d0,d1}^{min}$, D is set to 4, otherwise D is set to 3 (block is categorized as "strong diagonal" or "diagonal," respectively).

The activity value A is calculated as:

$$A = \sum_{k=i-M}^{i+N+M-1} \sum_{l=j-M}^{j+N+M-1} (V_{k,l} + H_{k,l}). \quad (13)$$

A is further quantized to the range of 0 to 4 inclusively, and the quantized value is denoted as Â:

$A=\min(15,(24 \cdot A)>>13)$ and $\hat{A}=Q[A]$, where $$Q=\{0,1,2,2,2,2,2,3,3,3,3,3,3,3,4\}. \quad (14)$$

Up to 25 filters can be signalled, one for each class. To reduce the number of bits required to represent the filter coefficients, different classes can be merged. However, unlike in HM-3.0, any set of classes can be merged, even classes having non-consecutive values of C. The information on which classes are merged is provided by coding, for each of the 25 classes, an index $i_C$. Classes having the same index $i_C$ share the same filter f(k,l).

Before filtering each block, simple geometric transformations such as rotation or diagonal and vertical flip can be applied to the filter coefficients f(k,l) depending on gradient values calculated for that block. This is equivalent to applying these transformations to the pixels in the filter support region. The idea is to make different blocks to which ALF is applied more similar by aligning their directionality. Geometric transformations are defined as FlipDiagonal: $f_D(k,l)=f(l,k)$, FlipVertical: $f_V(k,l)=f(k,K-l-1)$, RotateRight: $f_R(k,l)=f(K-l-1,k)$, (15)

where K is the size of the filter and 0≤k, l≤K−1 are coefficients coordinates, such that location (0,0) is at the upper left corner and location (K−1, K−1) is at the lower-right corner. Mapping between the gradient values calculated using Eqns. (7)-(10) and the geometric transformations specified in Eq. (15) is given in Table 1.

TABLE 1

Mapping of the gradient calculated for N × N block and the filter

| Gradient values | Filter coefficients |
| --- | --- |
| $g_{d2} < g_{d1}$ and $g_h < g_v$ | f (k, l) |
| $g_{d2} < g_{d1}$ and $g_v < g_h$ | $f_D$ (k, l) |
| $g_{d1} < g_{d2}$ and $g_h < g_v$ | $f_V$ (k, l) |
| $g_{d1} < g_{d2}$ and $g_v < g_h$ | $f_R$ (k, l) |

In some examples, prediction of filter coefficients may be from fixed filters. The temporal prediction of filter coefficients may improve coding efficiency for inter coded frames. To improve coding efficiency when temporal prediction is not available (intra frames), a set of n fixed filters is assigned to each class. In some examples, for each of the 25 classes, a flag is signalled if the fixed filter is used, and if required, an index of the chosen filter. In some examples, the value of the flag may indicate whether a fixed filter is used. In some examples, if required, an index may be signaled representing the chosen filter. Alternatively, one of the following three example defined cases may be used. In a first case, none of the filters of the 25 classes are predicted from the fixed filter. In a second case, all filters of the classes are predicted from the fixed filter. In a third case, filters associated with some classes are predicted from fixed filters and filters associated with the rest of the classes are not predicted from the fixed filters.

A variable may be coded to indicate which of the three example cases above applies. In addition, the following may apply:

If the variable indicates case 1, there is no need to further signal the index of the fixed filter.

Otherwise, if the variable indicates case 2, an index of the selected fixed filter for each class is coded.

Otherwise, if the variable indicates case 3, one bit for each class may first be signaled, and if the fixed filter is used, the index may further be signaled.

Even when the fixed filter is selected for a given class, the coefficients of the adaptive filter can still be sent for this class. The coefficients of the filter which will be applied to the reconstructed image are in this case the sum of the signalled coefficients f(k,l) and the fixed filter coefficients. Number of classes can share the same coefficients f(k,l) even if different fixed filters were chosen for them. In one alternative, the fixed filters applied to intra frames may also be applied to inter coded frames, such as P or B slices.

Figure 3:
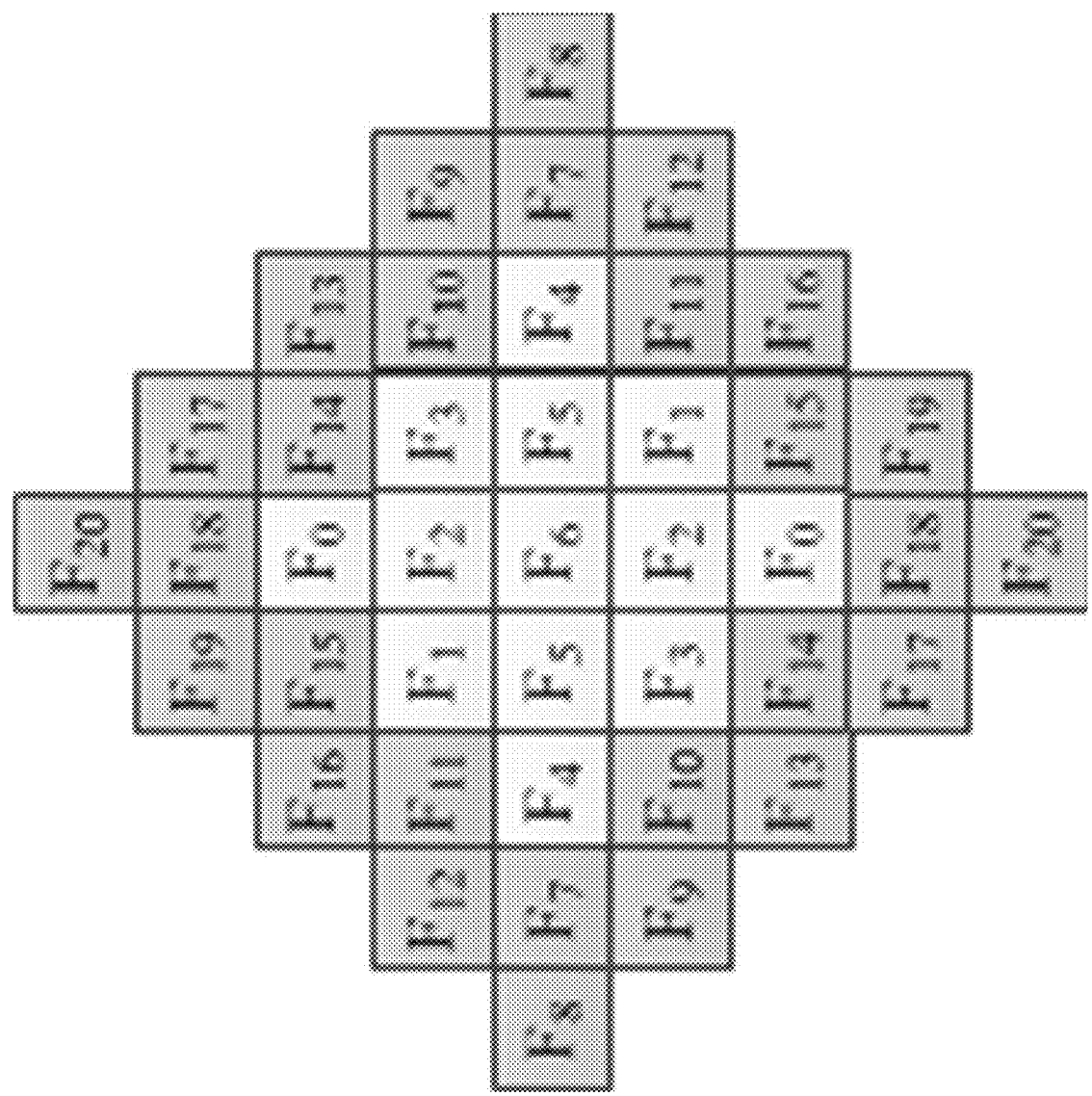
FIG. 3 is a conceptual diagram illustrating an example pattern for signaling filter coefficient differences.

FIG. 3 is a conceptual diagram illustrating an example pattern for signaling filter coefficient differences. The following techniques may be used to define one or more fixed filters, e.g., coefficient values for the fixed filters. In one example, the fixed filters are derived from off-line training and only filter coefficients for the largest filter tap (e.g., 9×9 diamond filter shape) are defined. Before coding the differences among the derived filter coefficients and selected fixed filters, a video coder may first code an index that indicates the pattern of signaling filter coefficient differences. For example, the fixed filter for a 9×9 symmetric diamond filter shape is depicted in FIG. 3, wherein the filter coefficient is indicated by $F_i$ (i being in the range of 0 to 20, inclusive). When the signaled pattern index indicates a 5×5 diamond filter shape, as shown in FIG. 3, and that filter coefficients are predicted from a fixed filter, the values of the derived filter coefficients located at the grey areas of FIG. 3 are kept unchanged and there is no need to signal the differences for these positions (i.e., differences for these grey positions are equal to 0). In this case, the video coder codes data defining differences between the derived coefficient and fixed filter coefficients (F0~F6). Alternatively, the video coder need not code data defining the difference of the DC coefficient (i.e., F6), but instead derives the difference for the DC coefficient on other coded difference values. Note that in this case, 9×9 diamond filtering process is always applied when filter coefficients are predicted from the fixed filter.

In another example, M versions of fixed filters may be pre-defined, wherein M indicates the total number of supported filter shapes. The video coder may code an index of the selected filter shape first, and then code data representing the indices of selected fixed filters associated with the filter shape. Note that in this case, multiple different filtering processes (depending on the value of M) are supported.

Figure 4:
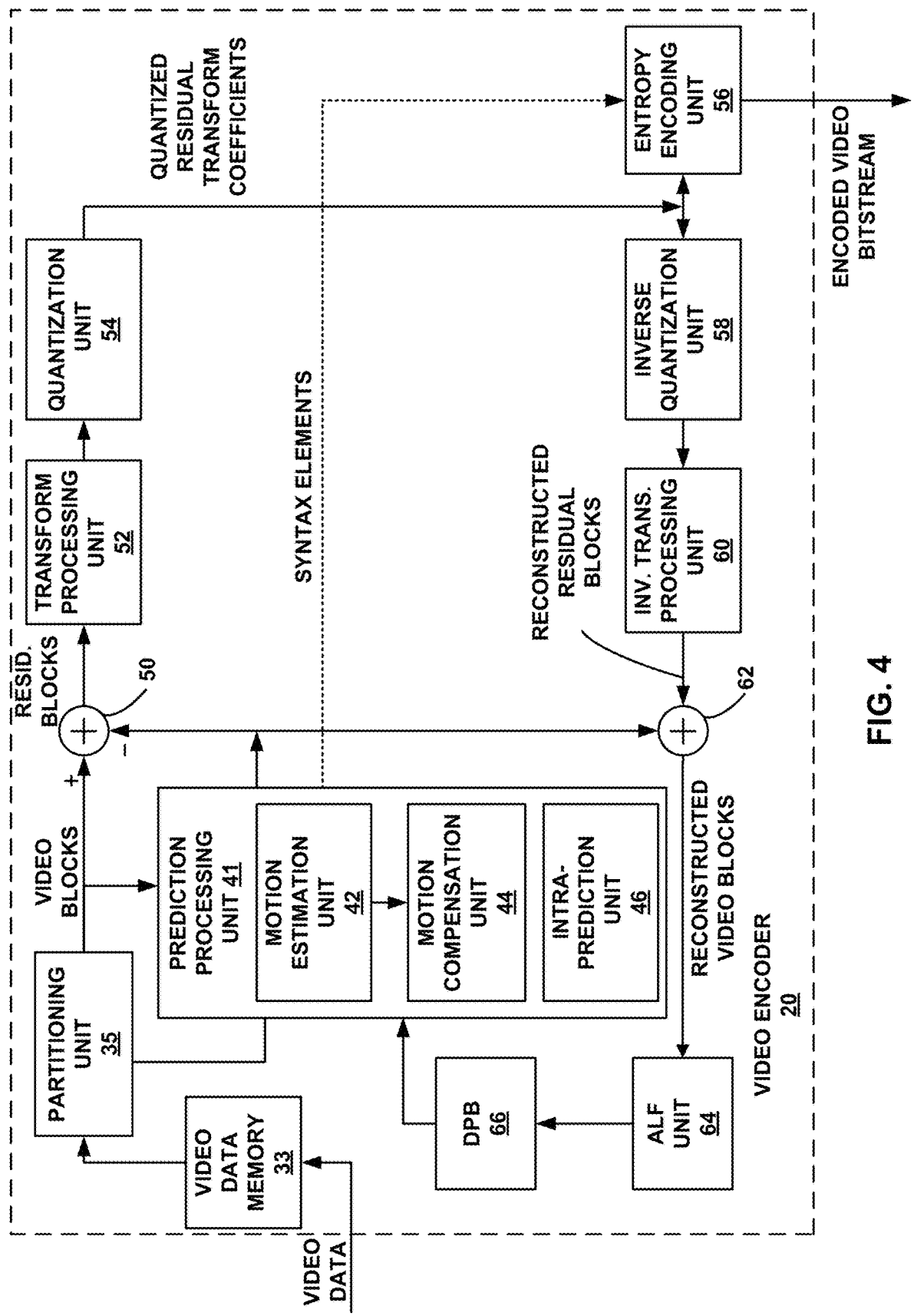
FIG. 4 is a block diagram illustrating an example video encoder that may implement the techniques described in this disclosure.

FIG. 4 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 4, video encoder 20 includes a video data memory 33, partitioning unit 35, prediction processing unit 41, summer 50, transform processing unit 52, quantization unit 54, entropy encoding unit 56. Prediction processing unit 41 includes motion estimation unit (MEU) 42, motion compensation unit (MCU) 44, and intra prediction unit 46. For video block reconstruction, video encoder 20 also includes inverse quantization unit 58, inverse transform processing unit 60, summer 62, ALF unit 64, and decoded picture buffer (DPB) 66.

As shown in FIG. 4, video encoder 20 receives video data and stores the received video data in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

Partitioning unit 35 retrieves the video data from video data memory 33 and partitions the video data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction unit 46 within prediction processing unit 41 may perform intra-prediction of the current video block relative to one or more neighboring blocks in the same frame or slice as the current block to be coded to provide spatial compression. Motion estimation unit 42 and motion compensation unit 44 within prediction processing unit 41 perform inter-prediction of the current video block relative to one or more reference blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 66. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After prediction processing unit 41 generates the predictive block for the current video block, either via intra prediction or inter prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed block.

ALF unit 64 filters the reconstructed block (e.g., the output of summer 62) and stores the filtered reconstructed block in DPB 66 for uses as a reference block. The reference block may be used by motion estimation unit 42 and motion compensation unit 44 as a reference block to inter-predict a block in a subsequent video frame or picture. Although not explicitly shown in FIG. 4, video encoder 20 may include additional filters such as one or more of a deblock filter, a sample adaptive offset (SAO) filter, or another type of loop filter. A deblock filter may, for example, apply deblocking filtering to filter block boundaries to remove blockiness artifacts from reconstructed video. An SAO filter may apply offsets to reconstructed pixel values in order to improve overall coding quality. In some implementations, SAO may be a special case or special mode of filtering. Additional loop filters (in loop or post loop) may also be used.

ALF unit 64, alone or in conjunction with other components of video encoder 20, may be configured to perform the various ALF techniques described in this disclosure. For example, the output of summer 62 is decoded video data that was previously encoded by other elements of video encoder 20 (such as prediction processing unit 41, transform processing unit 52, and quantization unit 54). Thus, ALF unit 64 may filter decoded video data according to the techniques of this disclosure. In particular, ALF unit 64 performs filtering as an "in-loop" filtering process, in that ALF unit 64 filters decoded pictures that are subsequently used as reference pictures, stored in DPB 66, to be used by prediction processing unit 41 to predict subsequent pictures.

In accordance with the techniques of this disclosure, ALF unit 64 may construct filters for various classes of blocks. ALF unit 64 may classify a block based on, for example, directionality of a gradient calculated from pixels of the block. In general, ALF unit 64 may construct a different filter for each class of block. However, in some cases, ALF unit 64 may calculate a set of filter coefficients used by two or more classes of blocks. For example, ALF unit 64 may calculate a plurality of sets of filter coefficients. ALF unit 64 may further encode an index value for each of the classes of blocks (or a subset of the classes of blocks) identifying one set of filter coefficients in the plurality of sets of filter coefficients. ALF unit 64 may construct a data structure specifying the indexes for each of the classes of blocks, and provide the data structure to entropy encoding unit 56 to be entropy encoded and included in the bitstream. Entropy encoding unit 56 may entropy encode the data structure and add the data structure to, e.g., a slice header, a picture parameter set, or other such data structure. Thus, in the case where ALF unit 64 encodes the same index for two or more classes of blocks, those classes of blocks will use the same set of filter coefficients, i.e., the set of filter coefficients corresponding to the encoded index value.

Additionally or alternatively, ALF unit 64 may indicate that, for at least one class of block, the filter is to be generated by using the same filter coefficients as a different class of block, but with a geometric transform applied to either a filter support region of the filter or the filter coefficients. Functionally, applying the geometric transform to the filter support region yields the same mathematical results as applying the geometric transform to the filter coefficients, and therefore, ALF unit 64 may apply the geometric transform to either the filter support region or the filter coefficients. In this example, ALF unit 64 may encode, for a current class of block, data identifying a geometric transform type (e.g., a rotation, a diagonal flip, or a vertical flip), as well as a previously constructed filter of which the filter coefficients are to be used for a generated filter for the current class of block. Again, ALF unit 64 may provide such data to entropy encoding unit 56, which may entropy encode the data and add the data to a data structure such as, for example, a slice header or picture parameter set.

Additionally or alternatively, ALF unit 64 may encode a value (e.g., of a flag) indicating whether a fixed filter is used to predict a set of filter coefficients for a class of block. Likewise, ALF unit 64 may provide these values to entropy encoding unit 56 to be entropy encoded, e.g., as part of a slice header, picture parameter set, or other such data structure. The flag may indicate, for example, either that filter coefficients for a filter of a class of block are predicted from a fixed filter, or are instead predicted (or inherited) from a filter of a reference picture. In some examples, ALF unit 64 may be configured with a plurality of fixed filters for each class of block. In such examples, ALF unit 64 may additionally encode an index into the plurality of fixed filters, identifying one of the plurality of fixed filters to be used to predict the filter coefficients of a current filter for the class of block, when the value indicates that the filter coefficients are predicted from a fixed filter.

In some examples, ALF unit 64 may further encode information indicating that either none of the filter coefficients for any of the classes are predicted from any fixed filter, that all filter coefficients are predicted from a fixed filter, or that there are some filter coefficients predicted from a fixed filter, while other filter coefficients are not predicted from a fixed filter. When none of the filter coefficients are predicted from a fixed filter, ALF unit 64 may avoid (e.g., omit or prevent) encoding of data representing an index into a plurality of fixed filters. On the other hand, when some or all of the filter coefficients are predicted from a fixed filter, ALF unit 64 may encode indexes into respective pluralities of fixed filters for those sets of filter coefficients that are predicted from a fixed filter, where the indexes identify the reference fixed filter from which the corresponding filter coefficients are to be predicted. Furthermore, ALF unit 64 may use the fixed filters identified by the indexes to predict the corresponding filter coefficients. After prediction, ALF unit 64 may further encode residual values (e.g., offset values), representing differences between the predicted filter coefficients and actual filter coefficient values.

ALF unit 64 may apply these techniques alone or in combination. For example, ALF unit 64 may explicitly encode a plurality of sets of filter coefficients, encode indexes for a first set of classes of blocks into the plurality of sets of filter coefficients, and predictively encode filter coefficients for filters of a second set of classes of blocks from either fixed filters or filters of one or more reference pictures in DPB 66. Alternatively, ALF unit 64 may encode each of a plurality of sets of filter coefficients either predicted from a fixed filter or from a filter of one or more reference pictures in DPB 66, and then for each of the classes of blocks, encode an index identifying one of the sets of filter coefficients. As yet another example, ALF unit 64 may encode filter coefficients for a first set of classes of blocks using any of the techniques above, and encode geometric transformation information for a second set of classes of blocks, including data identifying a geometric transformation and data identifying one of the first set of classes of blocks from which to inherit filter coefficients.

To determine how to select indexes for classes of blocks, whether to predict filter coefficients from fixed filters or reference pictures of DPB 66, and/or whether to generate a filter for a class of block using a geometric transformation as discussed above, video encoder 20 may execute a variety of encoding passes on a picture or sequence of pictures, and cause ALF unit 64 to apply various filtering techniques to various classes of blocks in the pictures. Video encoder 20 may calculate rate distortion optimization (RDO) metrics for the decoded, filtered pictures, to determine which combination of filter coefficients and filter coefficient prediction techniques result in the best RDO metrics. Video encoder 20 may then select the filter coefficients and filtering techniques for each picture based on the combination of filtering techniques that result in the best RDO metrics for each picture.

Figure 5:
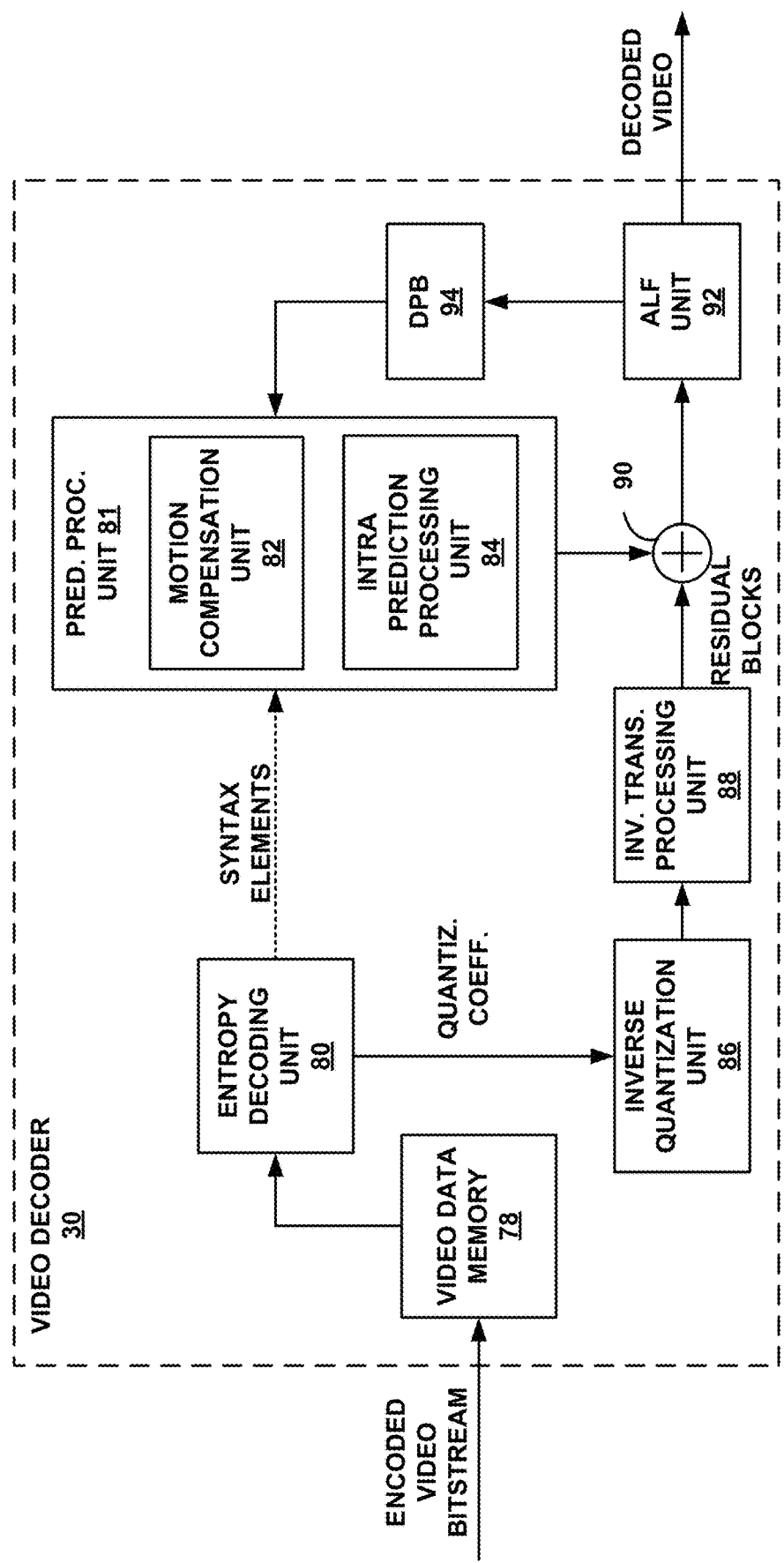
FIG. 5 is a block diagram illustrating an example video decoder that may implement the techniques described in this disclosure.

FIG. 5 is a block diagram illustrating an example video decoder 30 that may implement the techniques described in this disclosure. In the example of FIG. 5, video decoder 30 includes video data memory 78, entropy decoding unit 80, prediction processing unit 81, inverse quantization unit 86, inverse transform processing unit 88, summer 90, and decoded picture buffer (DPB) 94. Prediction processing unit 81 includes motion compensation unit 82 and intra prediction unit 84. Video decoder 30 may, in some examples, perform a decoding pass generally reciprocal to the encoding pass described with respect to video encoder 20 from FIG. 4.

During the decoding process, video decoder 30 receives an encoded video bitstream that represents video blocks of an encoded video slice and associated syntax elements from video encoder 20. Video decoder 20 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction unit 84 of prediction processing unit 81 may generate prediction data for a video block of the current video slice based on a signaled intra prediction mode and data from previously decoded blocks of the current frame or picture. When the video frame is coded as an inter-coded slice (e.g., B slice or P slice), motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 94.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., dequantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit generates the predictive block for the current video block using, for example, intra or inter prediction, video decoder 30 forms a reconstructed video block by summing the residual blocks from inverse transform processing unit 88 with the corresponding predictive blocks generated by motion compensation unit 82. Summer 90 represents the component or components that perform this summation operation. ALF unit 92 filters the reconstructed video block using, for example, one or more of the filter techniques described in this disclosure.

Although not explicitly shown in FIG. 5, video decoder 30 may also include one or more of a deblocking filter, an SAO filter, or other types of filters. Other loop filters (either in the coding loop or after the coding loop) may also be used to smooth pixel transitions or otherwise improve the video quality. The decoded video blocks in a given frame or picture are then stored in DPB 94, which stores reference pictures used for subsequent motion compensation. DPB 94 may be part of or separate from additional memory that stores decoded video for later presentation on a display device, such as display device 32 of FIG. 1.

ALF unit 92, alone or in conjunction with other components of video decoder 30, may be configured to perform the various techniques described in this disclosure including the techniques described in the claims section as well as elsewhere. For example, the output of summer 90 is decoded video data. Thus, ALF unit 92 may filter decoded video data according to the techniques of this disclosure. In particular, ALF unit 92 performs filtering as an "in-loop" filtering process, in that ALF unit 92 filters decoded pictures that are subsequently used as reference pictures, stored in DPB 94, to be used by prediction processing unit 81 to predict subsequent pictures.

ALF unit 92 may apply the techniques of this disclosure alone or in combination. For example, ALF unit 92 may explicitly decode a plurality of sets of filter coefficients, decode indexes for a first set of classes of blocks into the plurality of sets of filter coefficients, and predictively decode filter coefficients for filters of a second set of classes of blocks from either fixed filters or filters of one or more reference pictures in DPB 94, based on decoded data from the bitstream, such as a slice header or picture parameter set. Alternatively, ALF unit 92 may decode each of a plurality of sets of filter coefficients either predicted from a fixed filter or from a filter of one or more reference pictures in DPB 94, and then for each of the classes of blocks, decode an index identifying one of the sets of filter coefficients, based on decoded data from the bitstream, such as a slice header or picture parameter set. As yet another example, ALF unit 92 may decode filter coefficients for a first set of classes of blocks using any of the techniques above, and decode geometric transformation information for a second set of classes of blocks, including data identifying a geometric transformation and data identifying one of the first set of classes of blocks from which to inherit filter coefficients, based on decoded data from the bitstream, such as a slice header or picture parameter set. Thus, in general, In some examples, ALF unit 92 may construct filters for various classes of blocks. ALF unit 92 may classify a block based on, for example, directionality of a gradient calculated from pixels of the block. In general, ALF unit 92 may construct a different ALF for each class of block. However, in some cases, ALF unit 92 may calculate a set of filter coefficients used by two or more classes of blocks. For example, ALF unit 92 may calculate a plurality of sets of filter coefficients. ALF unit 92 may further decode an index value for each of the classes of blocks (or a subset of the classes of blocks) identifying one set of filter coefficients in the plurality of sets of filter coefficients. Entropy decoding unit 80 may entropy decode a data structure specifying the indexes for each of the classes of blocks, and provide the data structure to ALF unit 92. Entropy decoding unit 56 may entropy decode the data structure from, e.g., a slice header, a picture parameter set, or other such data structure. Thus, in the case where ALF unit 92 decodes the same index for two or more classes of blocks, those classes of blocks will use the same set of filter coefficients, i.e., the set of filter coefficients corresponding to the decoded index value.

Additionally or alternatively, ALF unit 92 may indicate that, for at least one class of block, the filter is to be generated by using the same filter coefficients as a different class of block, but with a geometric transform applied to either a filter support region of the filter or the filter coefficients. Functionally, applying the geometric transform to the filter support region yields the same mathematical results as applying the geometric transform to the filter coefficients, and therefore, ALF unit 92 may apply the geometric transform to either the filter support region or the filter coefficients. In this example, ALF unit 92 may decode, for a current class of block, data identifying a geometric transform type (e.g., a rotation, a diagonal flip, or a vertical flip), as well as a previously constructed filter of which the filter coefficients are to be used for a generated filter for the current class of block. Again, entropy decoding unit 80 may entropy decode such data and provide the decoded data to ALF unit 92. The data may be included in a data structure such as, for example, a slice header or picture parameter set.

Additionally or alternatively, entropy decoding unit 80 may entropy decode a value (e.g., of a flag) indicating whether a fixed filter is used to predict a set of filter coefficients for a class of block. Likewise, entropy decoding unit 80 may provide these values to ALF unit 92. Entropy decoding unit 80 may decode the data from part of a slice header, picture parameter set, or other such data structure. The flag may indicate, for example, either that filter coefficients for a filter of a class of block are predicted from a fixed filter, or are instead predicted (or inherited) from a filter of a reference picture. In some examples, ALF unit 92 may be configured with a plurality of fixed filters for each class of block. In such examples, ALF unit 92 may additionally decode an index into the plurality of fixed filters, identifying one of the plurality of fixed filters to be used to predict the filter coefficients of a current filter for the class of block, when the value indicates that the filter coefficients are predicted from a fixed filter.

In some examples, ALF unit 92 may further receive entropy decoded information indicating that either none of the filter coefficients for any of the classes are predicted from any fixed filter, that all filter coefficients are predicted from a fixed filter, or that there are some filter coefficients predicted from a fixed filter, while other filter coefficients are not predicted from a fixed filter. When none of the filter coefficients are predicted from a fixed filter, ALF unit 92 (or entropy decoding unit 80) may avoid (e.g., omit or prevent) decoding of data representing an index into a plurality of fixed filters. On the other hand, when some or all of the filter coefficients are predicted from a fixed filter, ALF unit 92 may decode indexes into respective pluralities of fixed filters for those sets of filter coefficients that are predicted from a fixed filter, where the indexes identify the reference fixed filter from which the corresponding filter coefficients are to be predicted. Furthermore, ALF unit 92 may use the fixed filters identified by the indexes to predict the corresponding filter coefficients. After prediction, ALF unit 92 may further decode residual values (e.g., offset values), representing differences between the predicted filter coefficients and actual filter coefficient values.

Figure 6:
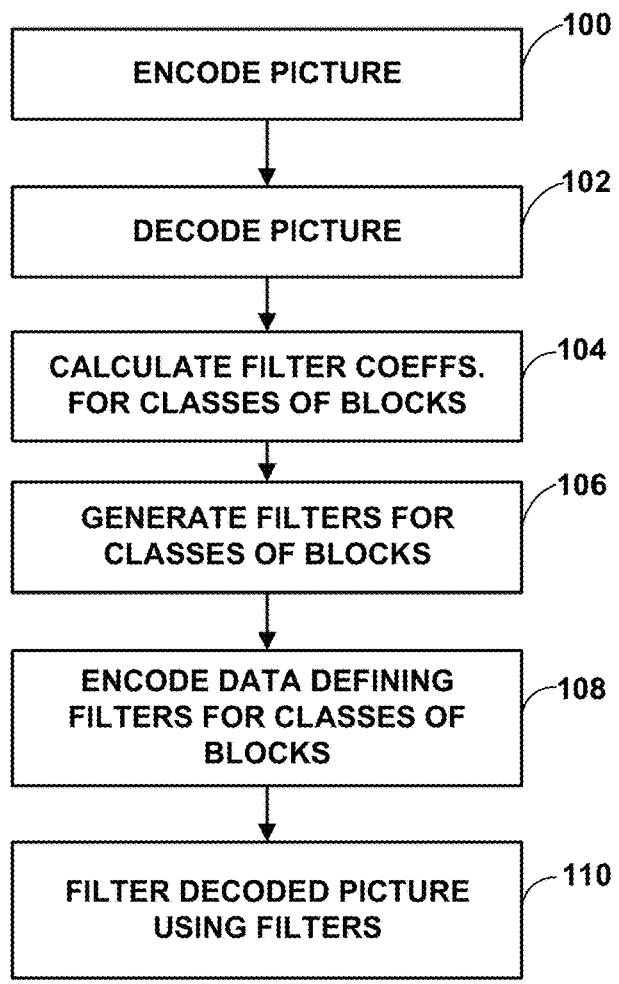
FIG. 6 is a flowchart illustrating an example method for filtering blocks of a decoded picture by a video encoder (e.g., during a video encoding process).

FIG. 6 is a flowchart illustrating an example method for filtering blocks of a decoded picture by a video encoder (e.g., during a video encoding process). For purposes of example and explanation, the method of FIG. 6 is described with respect to video encoder 20 of FIG. 4.

Initially, video encoder 20 encodes a picture (100). For example, video encoder 20 may intra- or inter-predict blocks of the picture, calculate residuals for the predicted blocks, transform and quantize the residual data, and entropy encode prediction information and quantized transform coefficients for the picture, as discussed above with respect to FIG. 4. Subsequently, video encoder 20 may decode the picture (102), e.g., by inverse quantizing and inverse transforming the quantized transform coefficients to reproduce residual values, then adding the residual values to the predicted blocks.

ALF unit 64 may then calculate filter coefficients for various classes of blocks (104). For example, ALF unit 64 may determine classes of blocks based on potential gradients for the blocks. ALF unit 64 may then generate filters for the classes of blocks from the calculated filter coefficients (106). ALF unit 64 may use any of the various techniques for generating filters of this disclosure. For example, for at least some classes of blocks, ALF unit 64 may select indexes into a plurality of sets of calculated filter coefficients, where the index for each class of block identifies the set of calculated filter coefficients to use to generate the filter for the corresponding class of block. Additionally or alternatively, for at least some classes of blocks, ALF unit 64 may generate data indicating a previously generated filter to be used, as well as a geometric transform to be applied to at least one of a filter support region or the filter coefficients of the previously generated filter. Additionally or alternatively, for at least some classes of blocks, ALF unit 64 may predict filter coefficients from either a fixed filter or a filter of a reference picture, and generate data indicating either the fixed filter or the reference picture from which the filter coefficients are to be predicted.

Furthermore, video encoder 20 may encode data defining the filters for the various classes of blocks (108). For example, for any class of block for which filters are to be generated using indexes into a plurality of sets of filter coefficients, entropy encoding unit 56 may entropy encode the indexes for those classes of blocks. Additionally or alternatively, for any class of block for which filters are to be generated using previously generated filters and a geometric transform, entropy encoding unit 56 may entropy encode data identifying the previously generated filters and the geometric transform to be applied (e.g., rotation, vertical flip, or diagonal flip). Additionally or alternatively, for any class of block for which filters are to be generated using filter coefficients predicted from a fixed filter, entropy encoding unit 56 may entropy encode data indicating whether the filter coefficients are to be predicted from a fixed filter or a filter of a reference picture, as well as an indication of the fixed filter or the reference picture.

ALF unit 64 may also filter blocks of the decoded picture using the corresponding filters (110). That is, for each block of the picture, ALF unit 64 may calculate a gradient, and determine a class for the block based on the gradient. ALF unit 64 may further select the filter corresponding to the class. ALF unit 64 may then filter each pixel of the block using the filter corresponding to the class for the block.

In this manner, the method of FIG. 6 represents an example of a method of filtering a decoded block of video data including constructing a plurality of filters for classes of blocks of a current picture of video data, wherein constructing the plurality of filters comprises, for each of the classes, determining whether a fixed filter is used to predict a set of filter coefficients of the class, and in response to determining that a fixed filter is used to predict the set of filter coefficients, determining an index value into a set of fixed filters of the class and predicting the set of filter coefficients of the class using a fixed filter of the set of fixed filters identified by the index value, decoding a current block of a current picture of the video data, determining a class for the current block, selecting a filter of the plurality of filters that corresponds to the class for the current block, and filtering at least one pixel of the current block using the selected filter.

Figure 7:
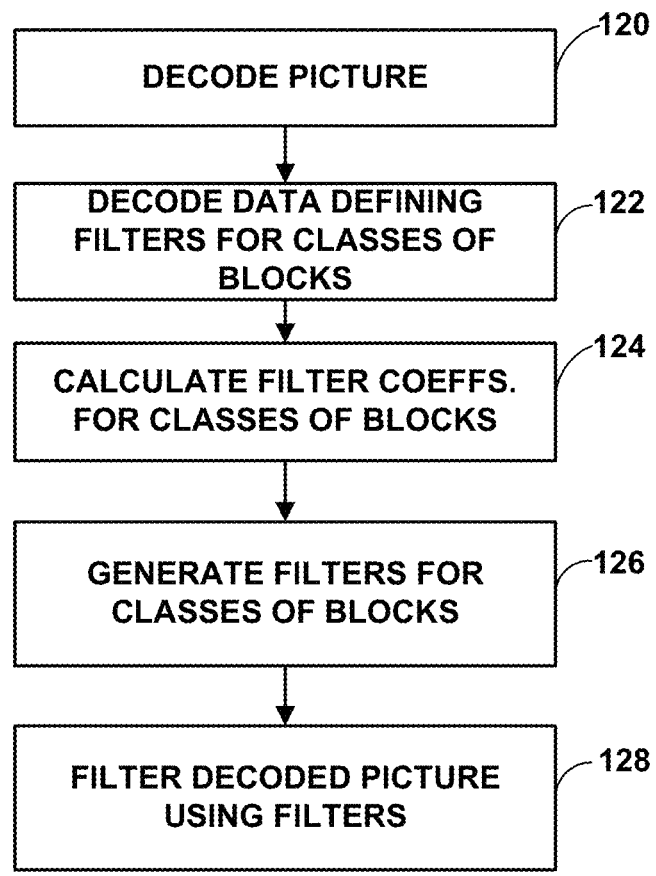
FIG. 7 is a flowchart illustrating an example method for filtering blocks of a decoded picture by a video decoder (e.g., during a video decoding process).

FIG. 7 is a flowchart illustrating i an example method for filtering blocks of a decoded picture by a video decoder (e.g., during a video decoding process). For purposes of example and explanation, the method of FIG. 6 is described with respect to video decoder 30 of FIG. 5.

Initially, video decoder 30 decodes a picture (120). For example, video decoder 30 may entropy decode prediction information and quantized transform coefficients for the picture, intra- or inter-predict blocks of the picture based on the prediction information, inverse quantize and inverse transform quantized transform coefficients to reproduce residual data, and combine the predicted blocks and the residual data to reproduce blocks, as discussed above with respect to FIG. 5.

Entropy decoding unit 80 may further entropy decode data defining filters for various classes of blocks (122). For example, entropy decoding unit 80 may entropy decode data indicating classes of blocks for which filters are to be generated using indexes into a plurality of sets of filter coefficients, and entropy decode the indexes for those classes of blocks. Additionally or alternatively, entropy decoding unit 80 may entropy decode data indicating classes of block for which filters are to be generated using previously generated filters and a geometric transform, as well as data identifying the previously generated filters and the geometric transform to be applied (e.g., rotation, vertical flip, or diagonal flip). Additionally or alternatively, entropy decoding unit 80 may entropy decode data indicating classes of block for which filters are to be generated using filter coefficients predicted from a fixed filter, and data indicating whether the filter coefficients are to be predicted from a fixed filter or a filter of a reference picture, as well as an indication of the fixed filter or the reference picture.

ALF unit 92 may then calculate filter coefficients for various classes of blocks (124). For example, ALF unit 92 may determine classes of blocks based on potential gradients for the blocks. ALF unit 92 may then generate filters for the classes of blocks from the calculated filter coefficients (126), based on the entropy decoded data representative of how to generate the filters as discussed above. ALF unit 92 may use any of the various techniques for generating filters of this disclosure. For example, for at least some classes of blocks, ALF unit 92 may receive indexes from entropy decoding unit 80 into a plurality of sets of calculated filter coefficients, where the index for each class of block identifies the set of calculated filter coefficients to use to generate the filter for the corresponding class of block. Additionally or alternatively, for at least some classes of blocks, ALF unit 92 may receive data from entropy decoding unit 80 indicating a previously generated filter to be used, as well as a geometric transform to be applied to at least one of a filter support region or the filter coefficients of the previously generated filter. Additionally or alternatively, for at least some classes of blocks, ALF unit 92 may predict filter coefficients from either a fixed filter or a filter of a reference picture, and generate data indicating either the fixed filter or the reference picture from which the filter coefficients are to be predicted, as indicated by data received from entropy decoding unit 80.

ALF unit 92 may then filter blocks of the decoded picture using the corresponding filters (128). That is, for each block of the picture, ALF unit 92 may calculate a gradient, and determine a class for the block based on the gradient. ALF unit 92 may further select the filter corresponding to the class. ALF unit 92 may then filter each pixel of the block using the filter corresponding to the class for the block.

In this manner, the method of FIG. 7 represents an example of a method of filtering a decoded block of video data including constructing a plurality of filters for classes of blocks of a current picture of video data, wherein constructing the plurality of filters comprises, for each of the classes, determining whether a fixed filter is used to predict a set of filter coefficients of the class, and in response to determining that a fixed filter is used to predict the set of filter coefficients, determining an index value into a set of fixed filters of the class and predicting the set of filter coefficients of the class using a fixed filter of the set of fixed filters identified by the index value, decoding a current block of a current picture of the video data, determining a class for the current block, selecting a filter of the plurality of filters that corresponds to the class for the current block, and filtering at least one pixel of the current block using the selected filter.

Figure 8:
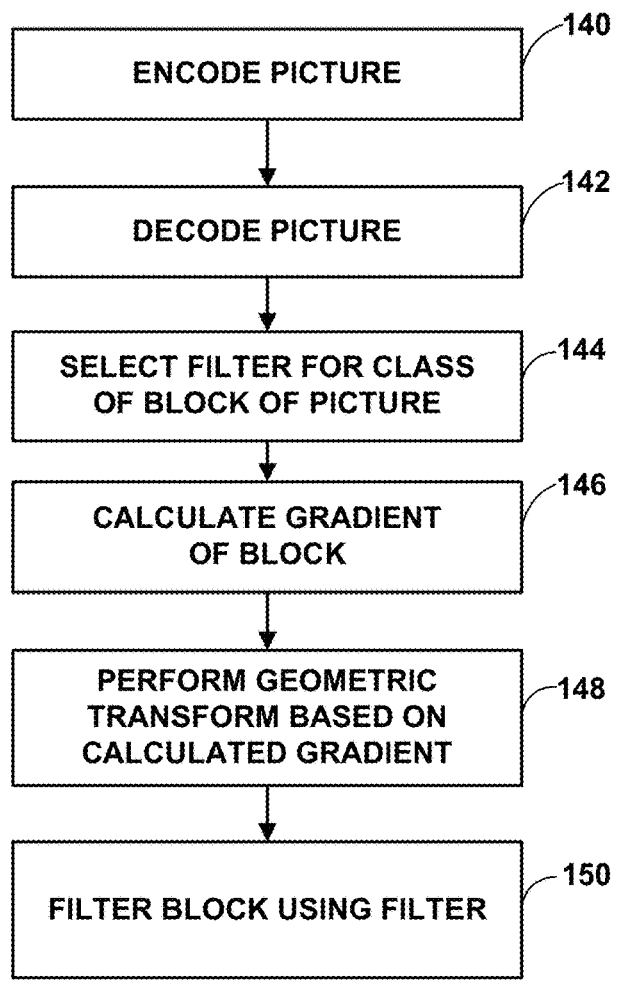
FIG. 8 is a flowchart illustrating an example method for filtering blocks of a decoded picture by a video encoder (e.g., during a video encoding process).

FIG. 8 is a flowchart illustrating an example method for filtering blocks of a decoded picture by a video encoder (e.g., during a video encoding process). For purposes of example and explanation, the method of FIG. 8 is described with respect to video encoder 20 of FIG. 4.

Initially, video encoder 20 encodes a picture (140). For example, video encoder 20 may intra- or inter-predict blocks of the picture, calculate residuals for the predicted blocks, transform and quantize the residual data, and entropy encode prediction information and quantized transform coefficients for the picture, as discussed above with respect to FIG. 4. Subsequently, video encoder 20 may decode the picture (142), e.g., by inverse quantizing and inverse transforming the quantized transform coefficients to reproduce residual values, then adding the residual values to the predicted blocks.

ALF unit 64 may then select a filter (such as according to adaptive loop filtering (ALF)) for a class of a block of the picture (144). ALF unit 64 may select the class based on, e.g., a gradient calculated for one or more pixels of the block. Alternatively, ALF unit 64 may determine a class for the block based on other characteristics of the block.

In accordance with techniques of this disclosure, ALF unit 64 may calculate a gradient of the block (146). ALF unit 64 may further determine and perform a geometric transform based on the calculated gradient (148). For example, ALF unit 64 may determine a geometric transform according to the techniques of Table 1 as discussed above. ALF unit 64 may apply the geometric transform either to coefficients of the selected filter or to a filter support region of the selected filter (e.g., neighboring pixels to a pixel to be filtered using the selected filter). ALF unit 64 may then filter the block of the decoded picture using the selected filter (150). That is, ALF unit 64 filter each pixel of the block using the selected filter.

In this manner, the method of FIG. 8 represents an example of a method of filtering a decoded block of video data including decoding a current block of a current picture of the video data, selecting a filter (such as according to adaptive loop filtering (ALF)) to be used to filter pixels of the current block, selecting a geometric transform to be performed on one of a filter support region or coefficients of the selected filter, performing the geometric transform on either the filter support region or the coefficients of the selected filter, and filtering the at least one pixel of the current block using the selected filter after performing the geometric transform.

Figure 9:
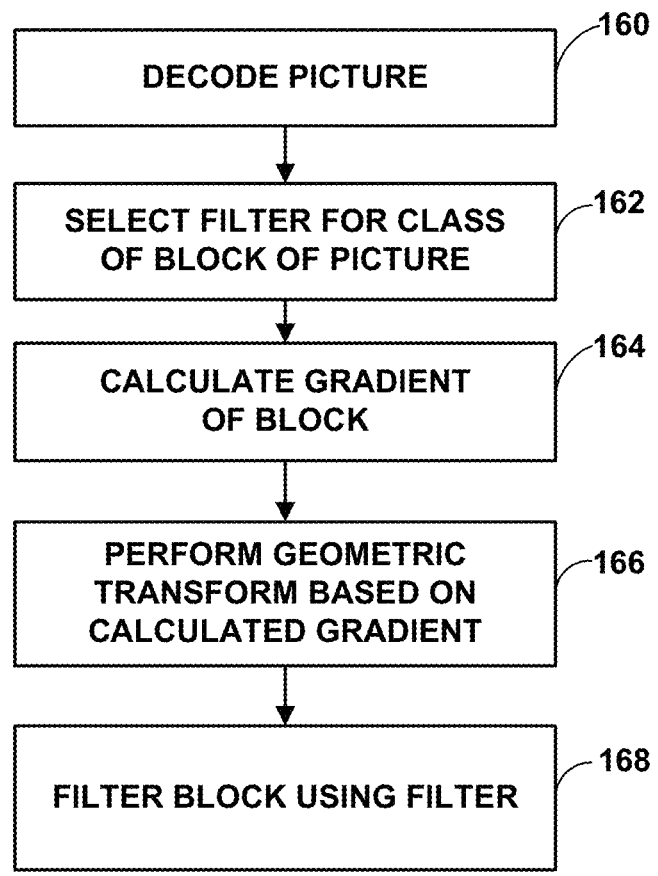
FIG. 9 is a flowchart illustrating an example method for filtering blocks of a decoded picture by a video decoder (e.g., during a video decoding process).

FIG. 9 is a flowchart illustrating an example method for filtering blocks of a decoded picture by a video decoder (e.g., during a video decoding process). For purposes of example and explanation, the method of FIG. 9 is described with respect to video decoder 30 of FIG. 5.

Initially, video decoder 30 decodes a picture (160), e.g., by entropy decoding values of syntax elements for prediction and quantized transform coefficients, inverse quantizing and inverse transforming the quantized transform coefficients to reproduce residual values, then adding the residual values to the predicted blocks. ALF unit 92 may then select a filter (such as according to adaptive loop filtering (ALF)) for a class of a block of the picture (162). ALF unit 92 may select the class based on, e.g., a gradient calculated for one or more pixels of the block. Alternatively, ALF unit 92 may determine a class for the block based on other characteristics of the block.

In accordance with techniques of this disclosure, ALF unit 92 may calculate a gradient of the block (164). ALF unit 92 may further determine and perform a geometric transform based on the calculated gradient (166). For example, ALF unit 92 may determine a geometric transform according to the techniques of Table 1 as discussed above. ALF unit 92 may apply the geometric transform either to coefficients of the selected filter or to a filter support region of the selected filter (e.g., neighboring pixels to a pixel to be filtered using the selected filter). ALF unit 92 may then filter the block of the decoded picture using the selected filter (168). That is, ALF unit 92 filter each pixel of the block using the selected filter.

In this manner, the method of FIG. 9 represents an example of a method of filtering a decoded block of video data including decoding a current block of a current picture of the video data, selecting a filter (such as according to adaptive loop filtering (ALF)) to be used to filter pixels of the current block, selecting a geometric transform to be performed on one of a filter support region or coefficients of the selected filter, performing the geometric transform on either the filter support region or the coefficients of the selected filter, and filtering the at least one pixel of the current block using the selected filter after performing the geometric transform.

Figure 10:
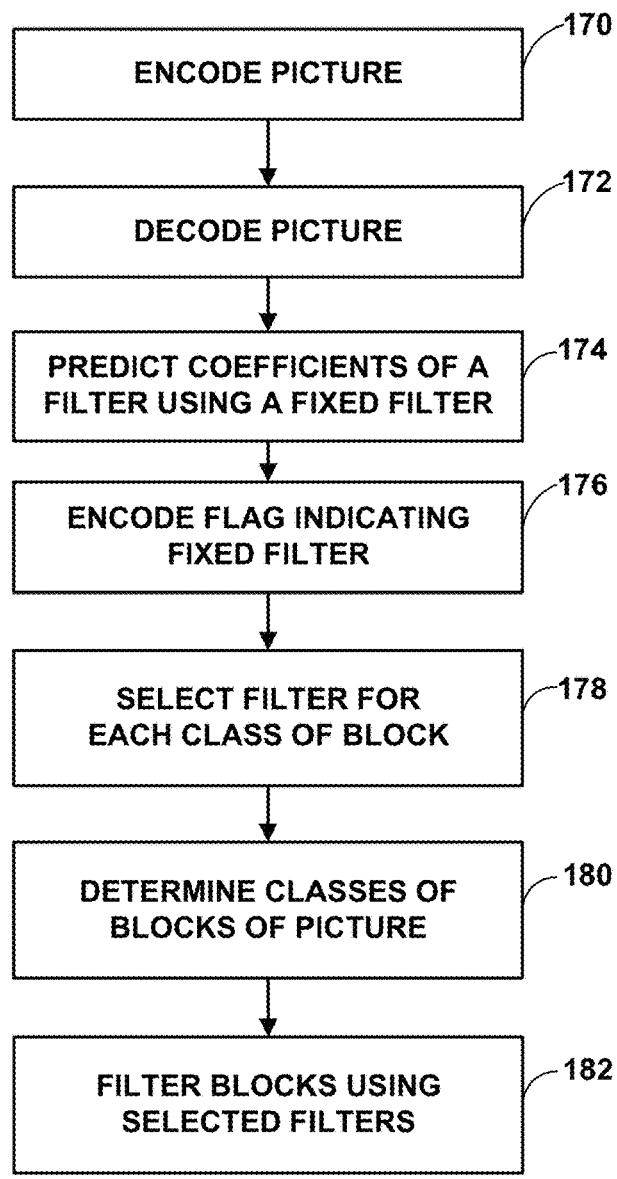
FIG. 10 is a flowchart illustrating an example method for filtering blocks of a decoded picture by a video encoder (e.g., during a video encoding process).

FIG. 10 is a flowchart illustrating an example method for filtering blocks of a decoded picture by a video encoder (e.g., during a video encoding process). For purposes of example and explanation, the method of FIG. 10 is described with respect to video encoder 20 of FIG. 4.

Initially, video encoder 20 encodes a picture (170). For example, video encoder 20 may intra- or inter-predict blocks of the picture, calculate residuals for the predicted blocks, transform and quantize the residual data, and entropy encode prediction information and quantized transform coefficients for the picture, as discussed above with respect to FIG. 4. Subsequently, video encoder 20 may decode the picture (172), e.g., by inverse quantizing and inverse transforming the quantized transform coefficients to reproduce residual values, then adding the residual values to the predicted blocks.

ALF unit 64 may then predict coefficients of a filter (such as according to adaptive loop filtering (ALF)) for a class of block of the picture using a fixed filter (174). ALF unit 64 may select the class based on, e.g., a gradient calculated for one or more pixels of the block. Alternatively, ALF unit 64 may determine a class for the block based on other characteristics of the block. In some examples, multiple fixed filters may be available for each class of block, and ALF unit 64 may test each of the available fixed filters to determine which results in the best rate-distortion performance. ALF unit 64 may then select the fixed filters that yield the best rate-distortion performance for each class of block, or a reference filter of a reference picture if the reference filter yields better rate-distortion performance. ALF unit 64 then encodes a flag indicating which of the fixed filters is used for each class of block (and additionally or alternatively, whether the filter for a particular class is predicted from a reference filter of a reference picture) (176).

ALF unit 64 may then select filters for each class of block of the decoded picture (178), determine classes for each of the blocks of the decoded picture (180), e.g., based on gradients calculated for the blocks, and filter the blocks using the selected filters (182). Again, ALF unit 64 may test different filters for each class of block to determine which filter yields the best rate-distortion performance. In accordance with the techniques of this disclosure, in some examples, ALF unit 64 may merge two or more classes of blocks, such that each of the merged classes uses the same filter. Moreover, video encoder 20 may encode data indicating which of the filters is to be used for each class of block.

In this manner, the method of FIG. 10 represents an example of a method of filtering a decoded block of video data including constructing a plurality of filters for classes of blocks of a current picture of video data, wherein constructing a plurality of filters for classes of blocks of a current picture of video data, wherein constructing the plurality of filters comprises, for each of the classes, determining whether a fixed filter is used to predict a set of filter coefficients of the class, and in response to determining that a fixed filter is used to predict the set of filter coefficients, determining an index value into a set of fixed filters of the class and predicting the set of filter coefficients of the class using a fixed filter of the set of fixed filters identified by the index value, decoding a current block of a current picture of the video data, determining a class for the current block, selecting a filter of the plurality of filters that corresponds to the class for the current block, and filtering at least one pixel of the current block using the selected filter.

Figure 11:
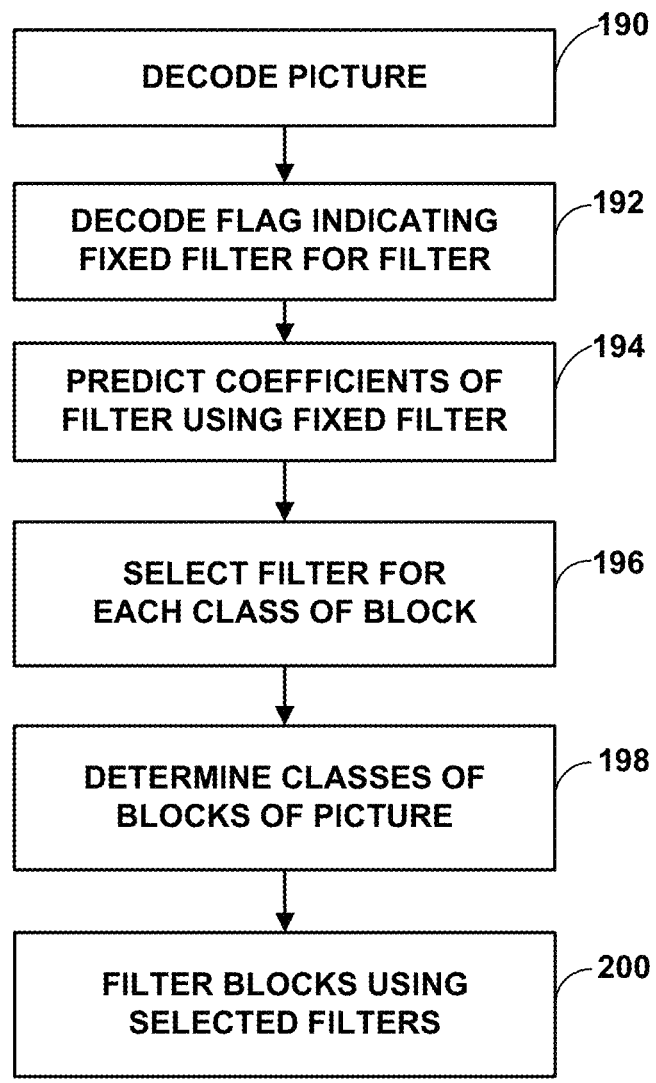
FIG. 11 is a flowchart illustrating an example method for filtering blocks of a decoded picture by a video decoder (e.g., during a video decoding process).

FIG. 11 is a flowchart illustrating an example method for filtering blocks of a decoded picture by a video decoder (e.g., during a video decoding process). For purposes of example and explanation, the method of FIG. 11 is described with respect to video decoder 30 of FIG. 5.

Initially, video decoder 30 decodes a picture of video data (190), e.g., by entropy decoding values of syntax elements for prediction and quantized transform coefficients, inverse quantizing and inverse transforming the quantized transform coefficients to reproduce residual values, then adding the residual values to the predicted blocks.

ALF unit 92 may then decode a flag indicating whether coefficients of a filter are to be predicted from a fixed filter (192), and in some examples, if the filter coefficients are to be predicted from a fixed filter, data identifying the fixed filter. ALF unit 92 may then predict the coefficients of the filter using the fixed filter (assuming that the filter coefficients are to be predicted from the fixed filter in this example) (194). In other examples, ALF unit 92 may predict filter coefficients from a reference filter of a reference picture, if the flag indicates that the filter coefficients are not predicted from a fixed filter.

ALF unit 92 may then select filters for each class of block of the decoded picture (196), determine classes for each of the blocks of the decoded picture (198), e.g., based on gradients calculated for the blocks, and filter the blocks using the selected filters (200). ALF unit 92 may decode data for each class of block identifying a filter to be used to filter pixels of blocks of that class.

In this manner, the method of FIG. 11 represents an example of a method of filtering a decoded block of video data including constructing a plurality of filters for classes of blocks of a current picture of video data, wherein constructing the plurality of filters comprises, for each of the classes, determining whether a fixed filter is used to predict a set of filter coefficients of the class, and in response to determining that a fixed filter is used to predict the set of filter coefficients, determining an index value into a set of fixed filters of the class and predicting the set of filter coefficients of the class using a fixed filter of the set of fixed filters identified by the index value, decoding a current block of a current picture of the video data, determining a class for the current block, selecting a filter of the plurality of filters that corresponds to the class for the current block, and filtering at least one pixel of the current block using the selected filter.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements. Hence, a processor may be formed by any of a variety of integrated processing circuitry comprising one or more processors implemented as fixed hardware processing circuitry, programmable processing circuitry and/or a combination of both fixed and programmable processing circuitry.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of filtering a decoded block of video data, the method comprising:
    assigning a set of n fixed filters to each class of a plurality of classes of blocks of a current picture of video data, wherein a fixed filter is used to predict filter coefficients of a filter to be applied to a decoded block of video data;
    for each class which uses a fixed filter, selecting a fixed filter of the set of n fixed filters, wherein a first fixed filter is selected for a first class, and a second fixed filter, different than the first fixed filter, is selected for a second class;
    for each class that uses a fixed filter, generating the set of filter coefficients to be applied to a decoded block of video data of the class, including adding filter coefficients of the selected fixed filter to a set of signaled filter coefficients for the class, wherein a common set of signaled filter coefficients is used for at least the first class and the second class;
    decoding a current block of a current picture of the video data;
    determining a class for the current block;
    selecting a generated set of filter coefficients that corresponds to the class for the current block; and
    filtering at least one pixel of the current block using the selected set of filter coefficients.

2. The method of claim 1, further comprising determining, for each of the classes, whether a fixed filter is used to predict the set of filter coefficients, including determining, for each of the classes, a value of a flag that indicates whether the fixed filter is used to predict the set of filter coefficients for the class.

3. The method of claim 1, further comprising:
    constructing a plurality of filters; and
    determining a value representing one of:
        that all of the sets of filter coefficients for all of the classes are predicted from at least one of the fixed filters; or
        that some of the sets of filter coefficients of the classes are predicted from one or more of the fixed filters and the remaining sets of filter coefficients are not predicted from any of the fixed filters.

4. The method of claim 3, further comprising, when the value represents that all of the sets of filter coefficients for all of the classes are predicted from at least one of the fixed filters, determining index values for each of the classes representing the one of the fixed filters from which the set of filter coefficients for the corresponding class is predicted.

5. The method of claim 3, further comprising, when the value represents that all of the sets of filter coefficients for all of the classes are predicted from at least one of the fixed filters, preventing coding of a flag that indicates whether a fixed filter is used to predict a set of filter coefficients of each class.

6. The method of claim 3, further comprising, when the value represents that some of the sets of filter coefficients of the classes are predicted from one or more of the fixed filters:
    determining which of the classes correspond to sets of filter coefficients that are predicted from one or more of the fixed filters; and
    for each of the sets of filter coefficients that are predicted from one or more of the fixed filters, determining the index value representing the fixed filter of the one or more fixed filters from which the corresponding set of filter coefficients is predicted.

7. The method of claim 1, further comprising encoding the current block prior to decoding the current block.

8. A device for filtering a decoded block of video data, the device comprising:
    a memory configured to store the video data; and
    one or more processing units implemented in circuitry and configured to:
        assign a set of n fixed filters to each class of a plurality of classes of blocks of a current picture of video data, wherein a fixed filter is used to predict filter coefficients of a filter to be applied to a decoded block of video data;
        for each class that uses a fixed filter, selecting a fixed filter of the set of n fixed filters, wherein a first fixed filter is selected for a first class, and a second fixed filter, different than the first fixed filter, is selected for a second class;
        for each class which uses a fixed filter, generate the set of filter coefficients to be applied to a decoded block of video data of the class by adding filter coefficients of the selected fixed filter to a set of signaled filter coefficients of the class, wherein a common set of signaled filter coefficients is used for at least the first class and the second class;
        decode a current block of a current picture of the video data;
        determine a class for the current block;
        select the generated set of filter coefficients that corresponds to the class for the current block; and
        filter at least one pixel of the current block using the selected set of filter coefficients.

9. The device of claim 8, wherein the one or more processing units are further configured to determine, for each of the classes, whether a fixed filter is used to predict the set of filter coefficients according to a value of a flag that indicates whether the fixed filter is used to predict the set of filter coefficients for the class.

10. The device of claim 8, wherein the one or more processing units are further configured to:
   construct a plurality of filters; and
   determine a value representing one of:
      that all of the sets of filter coefficients for all of the classes are predicted from at least one of the fixed filters; or
      that some of the sets of filter coefficients of the classes are predicted from one or more of the fixed filters and the remaining sets of filter coefficients are not predicted from any of the fixed filters.

11. The device of claim 10, wherein the one or more processing units are further configured to, when the value represents that all of the sets of filter coefficients for all of the classes are predicted from at least one of the fixed filters, determine index values for each of the classes representing the one of the fixed filters from which the set of filter coefficients for the corresponding class is predicted.

12. The device of claim 10, wherein the one or more processing units are further configured to, when the value represents that all of the sets of filter coefficients for all of the classes are predicted from at least one of the fixed filters, prevent coding of a flag that indicates whether a fixed filter is used to predict a set of filter coefficients of each class.

13. The device of claim 10, wherein the one or more processing units are further configured to, when the value represents that some of the sets of filter coefficients of the classes are predicted from one or more of the fixed filters:
   determine which of the classes correspond to sets of filter coefficients that are predicted from one or more of the fixed filters; and
   for each of the sets of filter coefficients that are predicted from one or more of the fixed filters, determine the index value representing the fixed filter of the one or more fixed filters from which the corresponding set of filter coefficients is predicted.

14. The device of claim 8, wherein the one or more processing units are further configured to encode the current block prior to decoding the current block.

15. The device of claim 8, wherein the device is a wireless communication device, further comprising:
   a receiver configured to receive video data including the current picture.

16. The device of claim 15, wherein the wireless communication device is a cellular telephone and the video data is received by the receiver and modulated according to a cellular communication standard.

17. A non-transitory computer-readable storage medium having stored therein instructions that, when executed, cause a processor to:
   assign a set of n fixed filters to each class of a plurality of classes of blocks of a current picture of video data, wherein a fixed filter is used to predict filter coefficients of a filter to be applied to a decoded block of video data;
   for each class that uses a fixed filter, select a fixed filter of the set of n fixed filters, wherein a first fixed filter is selected for a first class, and a second fixed filter, different than the first fixed filter, is selected for a second class;
   for each class that uses a fixed filter, generate the set of filter coefficients to be applied to a decoded block of video data of the class, including instructions that cause the processor to add filter coefficients of the selected fixed filter to a set of signaled filter coefficients for the class, wherein a common set of signaled filter coefficients is used for at least the first class and the second class;
   decode a current block of a current picture of the video data;
   determine a class for the current block; selecting a generated set of filter coefficients that corresponds to the class for the current block; and
   filter at least one pixel of the current block using the selected set of filter coefficients.

18. The non-transitory computer-readable storage medium of claim 17, further comprising instructions that cause the processor to determine, for each of the classes, whether a fixed filter is used to predict the set of filter coefficients, including instructions that cause the processor to determine, for each of the classes, a value of a flag that indicates whether the fixed filter is used to predict the set of filter coefficients for the class.

19. The non-transitory computer-readable storage medium of claim 17, further comprising instructions that cause the processor to:
   construct a plurality of filters; and
   determine a value representing one of:
      that all of the sets of filter coefficients for all of the classes are predicted from at least one of the fixed filters; or
      that some of the sets of filter coefficients of the classes are predicted from one or more of the fixed filters and the remaining sets of filter coefficients are not predicted from any of the fixed filters.

20. The non-transitory computer-readable storage medium of claim 17, further comprising instructions that cause the processor to encode the current block prior to decoding the current block.

* * * * *